(12) United States Patent
Mimoto et al.

(10) Patent No.: US 10,179,715 B2
(45) Date of Patent: Jan. 15, 2019

(54) SHEET-FEEDING DEVICE INCLUDING SECOND FEEDING ROLLER FOR FEEDING SHEETS IN ADDITION TO FIRST FEEDING ROLLER

(71) Applicant: BROTHER KOGYO KABUSHIKI KAISHA, Nagoya-shi, Aichi-ken (JP)

(72) Inventors: Masao Mimoto, Nagoya (JP); Aya Kimura, Yokohama (JP); Tsuyoshi Ito, Nagoya (JP); Iwane Sano, Obu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/898,770

(22) Filed: Feb. 19, 2018

(65) Prior Publication Data
US 2018/0273316 A1   Sep. 27, 2018

(30) Foreign Application Priority Data
Mar. 27, 2017 (JP) .................. 2017-060581

(51) Int. Cl.
*B65H 3/06* (2006.01)
*H04N 1/00* (2006.01)
(Continued)

(52) U.S. Cl.
CPC .......... *B65H 3/0669* (2013.01); *B65H 3/047* (2013.01); *B65H 3/0638* (2013.01);
(Continued)

(58) Field of Classification Search
CPC .. B65H 3/0684; B65H 3/0676; B65H 3/0669; B65H 3/047; B65H 3/0638; B65H 7/02;
(Continued)

(56) References Cited

U.S. PATENT DOCUMENTS 7,614,621 B2 * 11/2009 Asada ................. B65H 3/0676
271/117
7,722,030 B2 * 5/2010 Sugiyama ........... B65H 3/0676
271/117

(Continued)

FOREIGN PATENT DOCUMENTS

JP   2006027780 A   * 2/2006
JP   2010-37047 A    2/2010

*Primary Examiner* — Luis A Gonzalez
(74) *Attorney, Agent, or Firm* — Merchant & Gould P.C.

(57) ABSTRACT

A sheet-feeding device includes: a first feeding roller configured to contact a sheet accommodated in a sheet-accommodation portion to feed the sheet; a second feeding roller movable between a non-feeding position and a feeding position; a driving source configured to generate a rotational driving force to the first feeding roller; a transmission portion configured to transmit the rotational driving force to the second feeding roller; a first sensor; a second sensor; and a roller actuating portion. The roller actuating portion is configured to: move the second feeding roller from the non-feeding position to the feeding position in a case where the second detector detects rotation of the first feeding roller is stopped during a sheet-feeding operation; and move the second feeding roller from the feeding position to the non-feeding position in a case where the first sensor detects the sheet-feeding operation is completed for the sheet.

12 Claims, 19 Drawing Sheets

(51) Int. Cl.
*B65H 7/20* (2006.01)
*B65H 3/04* (2006.01)

(52) U.S. Cl.
CPC ......... *B65H 3/0676* (2013.01); *B65H 3/0684* (2013.01); *B65H 7/20* (2013.01); *H04N 1/00602* (2013.01); *B65H 2404/1421* (2013.01); *B65H 2404/1521* (2013.01)

(58) Field of Classification Search
CPC ... B65H 7/14; B65H 7/06; B65H 7/20; B65H 2404/1421; B65H 2404/1521
See application file for complete search history.

(56) References Cited

U.S. PATENT DOCUMENTS

| 7,887,043 B2* | 2/2011 | Takamori | B65H 3/0684 |
| | | | 271/121 |
| 8,113,504 B2* | 2/2012 | Cahill | B65H 1/14 |
| | | | 271/126 |
| 9,272,859 B2* | 3/2016 | Sato | B65H 3/0669 |
| 2010/0032891 A1 | 2/2010 | Togashi et al. | |

* cited by examiner

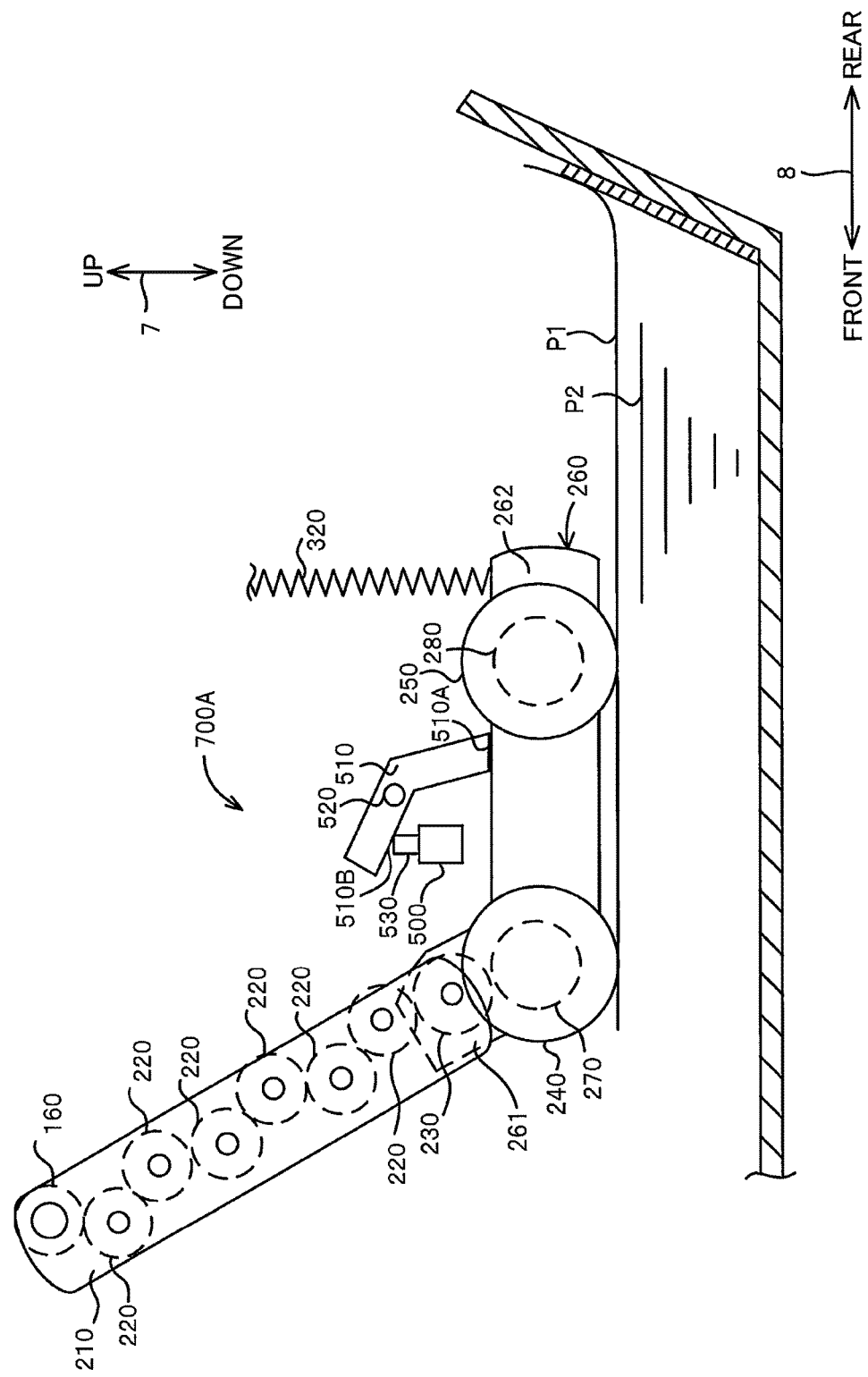

SHEET-FEEDING DEVICE INCLUDING SECOND FEEDING ROLLER FOR FEEDING SHEETS IN ADDITION TO FIRST FEEDING ROLLER

CROSS REFERENCE TO RELATED APPLICATION

This application claims priority from Japanese Patent Application No. 2017-060581 filed Mar. 27, 2017. The entire content of the priority application is incorporated herein by reference.

TECHNICAL FIELD

The present disclosure relates to a sheet-feeding device configured to feed a sheet of a sheet stack.

BACKGROUND

A conventional image-forming apparatus, such as a printer and a facsimile machine, includes a sheet accommodating portion configured to accommodate a stack of sheets therein (such as a sheet tray and a sheet cassette), and a sheet-feed roller configured to feed each of the sheets stacked on the sheet accommodating portion. The sheet-feed roller is made from material having high friction coefficient such as rubber. Each sheet is fed by friction force generated between the sheet-feed roller and the sheet upon rotation of the sheet-feed roller.

Various kinds of sheets are used in the image-forming apparatus depending on intended purposes of use. Among various kinds of sheets, glossy paper (calendered paper) is known as sheets having high rigidity and high surface friction coefficient. In case of a stack of such sheets having high friction coefficient at each surface, a large frictional force is generated between the stacked sheets, generating large sheet-feeding resistance when the sheet-feed roller feeds the sheets. If the frictional force between the sheets becomes larger than the frictional force between the sheet and the sheet-feed roller, rotation of the sheet-feed roller may stop on the sheet so that a sheet-feeding operation can no longer be performed.

Conceivably, in order to avoid a sheet-feeding failure, frictional force between the sheet-feed roller and the sheet may be increased. The frictional force generated between the sheet-feed roller and the sheet may vary depending on a material of the sheet-feed roller, and an area of contact between the roller and the sheet. That is, the frictional force between the sheet-feed roller and the sheet can be increased by providing a sheet-feed roller made from a material having high friction coefficient, or by increasing the area of contact between the roller and the sheet.

Japanese Patent Application Publication No. 2010-037047 discloses a sheet-feeding device using a belt for feeding sheets, rather than a sheet-feed roller. Since the belt can make contact with each sheet with a larger area than the sheet-feed roller does with each sheet, the sheet can be fed with an increased frictional force generated by the belt, restraining occurrence of non-feeding of the sheet.

SUMMARY

However, the present inventors discovered a new problem in sheet-feeding that may occur in the belt type sheet-feeding device described above. Specifically, in the belt type sheet-feeding device, even though the sheet can be fed with increased frictional force due to the increased area of contact with the sheet, pressing force applied from the sheet-feeding apparatus to the sheet also increases, which may result in multiple-feeding of sheets. That is, not only an uppermost sheet but also sheets below the uppermost sheet are fed concurrently with the uppermost sheet.

In view of the foregoing, it is an object of the disclosure to provide a sheet-feeding device capable of increasing an area of contact between a sheet-feed roller and a sheet to realize sheet feeding with an increased frictional force, to thus solve non-feeding of sheets, only when sheet feeding cannot be performed due to a halt in rotation of the sheet-feed roller during a sheet-feeding operation.

In order to attain the above and other objects, according to one aspect, the disclosure provides a sheet-feeding device including: a sheet-accommodation portion configured to accommodate therein a sheet; a first feeding roller configured to contact the sheet accommodated in the sheet-accommodation portion and to feed the sheet in a sheet-feeding direction; a second feeding roller; a driving source configured to generate a rotational driving force to rotate the first feeding roller; a transmission portion configured to transmit the rotational driving force from the first feeding roller to the second feeding roller to rotate the second feeding roller; a first sensor; a second sensor; and a roller actuating portion. The second feeding roller is movable between a non-feeding position and a feeding position. The second feeding roller at the non-feeding position is spaced away from the sheet accommodated in the sheet-accommodation portion. The second feeding roller at the feeding position is in contact with the sheet and is configured to feed the sheet in the sheet-feeding direction. The first sensor is configured to detect whether or not a sheet-feeding operation is completed for the sheet. The second sensor is configured to detect whether or not rotation of the first feeding roller is stopped during the sheet-feeding operation for feeding the sheet. The roller actuating portion is configured to move the second feeding roller from the non-feeding position to the feeding position in a case where the second sensor detects that the rotation of the first feeding roller is stopped during the sheet-feeding operation. The roller actuating portion is also configured to move the second feeding roller from the feeding position to the non-feeding position in a case where the first sensor detects that the sheet-feeding operation is completed for the sheet.

According to another aspect, the disclosure provides a sheet-feeding device including: a sheet-accommodation portion configured to accommodate therein a sheet; a first feeding roller configured to contact the sheet accommodated in the sheet-accommodation portion and to feed the sheet in a sheet-feeding direction; a second feeding roller; a first motor configured to generate a rotational driving force to rotate the first feeding roller; a second motor configured to generate a rotational driving force to rotate the second feeding roller; a first sensor; a second sensor; and a roller actuating portion. The second feeding roller is movable between a non-feeding position and a feeding position. The second feeding roller at the non-feeding position is spaced away from the sheet accommodated in the sheet-accommodation portion. The second feeding roller at the feeding position is in contact with the sheet and is configured to feed the sheet in the sheet-feeding direction. The first sensor is configured to detect whether or not a sheet-feeding operation is completed for the sheet. The second sensor is configured to detect whether or not rotation of the first feeding roller is stopped during the sheet-feeding operation for feeding the sheet. The roller actuating portion is configured to move the second feeding roller from the non-feeding position to the feeding position in a case where the second detector detects that the rotation of the first feeding roller is stopped during the sheet-feeding operation. The roller actuating portion is also configured to move the second feeding roller from the feeding position to the non-feeding position in a case where the first sensor detects that the sheet-feeding operation is completed for the sheet. The roller actuating portion includes: a moving mechanism configured to movably support the second feeding roller between the non-feeding position and the feeding position; a moving-mechanism driving portion configured to move the moving mechanism to allow the second feeding roller to move between the non-feeding position and the feeding position; and a controller. The controller is configured to: determine whether the second feeding roller is at the non-feeding position or at the feeding position; drive the moving-mechanism driving portion to move the second feeding roller from the non-feeding position to the feeding position in the case where the second sensor detects that the rotation of the first feeding roller is stopped during the sheet-feeding operation for the sheet; drive the second motor to rotate the second feeding roller in a case where the second feeding roller is determined to be at the feeding position; drive the moving-mechanism driving portion to move the second feeding roller from the feeding position to the non-feeding position in the case where the first sensor detects that the sheet-feeding operation is completed; and stop driving to the second motor to stop rotation of the second feeding roller in a case where the second feeding roller is determined to be at the non-feeding position.

According to still another aspect, the disclosure provides a sheet-feeding device including: a sheet-accommodation portion configured to accommodate therein a sheet; a first roller; a second roller; a feeding belt mounted over the first roller and the second roller; a roller driving portion configured to generate a rotational driving force to rotate at least one of the first roller and the second roller; a first sensor; a second sensor; and a roller actuating portion. The second roller is movable between a separated position spaced away from the sheet accommodated in the sheet-accommodation portion and a proximity position closer to the sheet accommodated in the sheet-accommodation portion than the separated position is to the sheet. The feeding belt is configured to contact the sheet accommodated in the sheet-accommodation portion and is configured to move upon receipt of the rotational driving force to feed the sheet in a sheet-feeding direction. The first sensor is configured to detect whether or not a sheet-feeding operation is completed for the sheet. The second sensor is configured to detect whether or not movement of the feeding belt is stopped during the sheet-feeding operation. The roller actuating portion is configured to move the second roller from the separated position to the proximity position in a case where the second sensor detects that the movement of the feeding belt is stopped during the sheet-feeding operation for the sheet. The roller actuating portion is also configured to move the second roller from the proximity position to the separated position in a case where the first sensor detects that the sheet-feeding operation is completed for the sheet. The feeding belt has a first region in contact with the sheet accommodated in the sheet-accommodation portion in a case where the second roller is at the separated position. The feeding belt has a second region in contact with the sheet accommodated in the sheet-accommodation portion in a case where the second roller is at the proximity position, the second region being larger than the first region.

BRIEF DESCRIPTION OF THE DRAWINGS

The particular features and advantages of the embodiment(s) as well as other objects will become apparent from the following description taken in connection with the accompanying drawings, in which:

FIG. 19 is a schematic view of the sheet-feeding portion according to the eighth modification in a state where the second feeding roller is at the feeding position.

DETAILED DESCRIPTION

Figure 1:
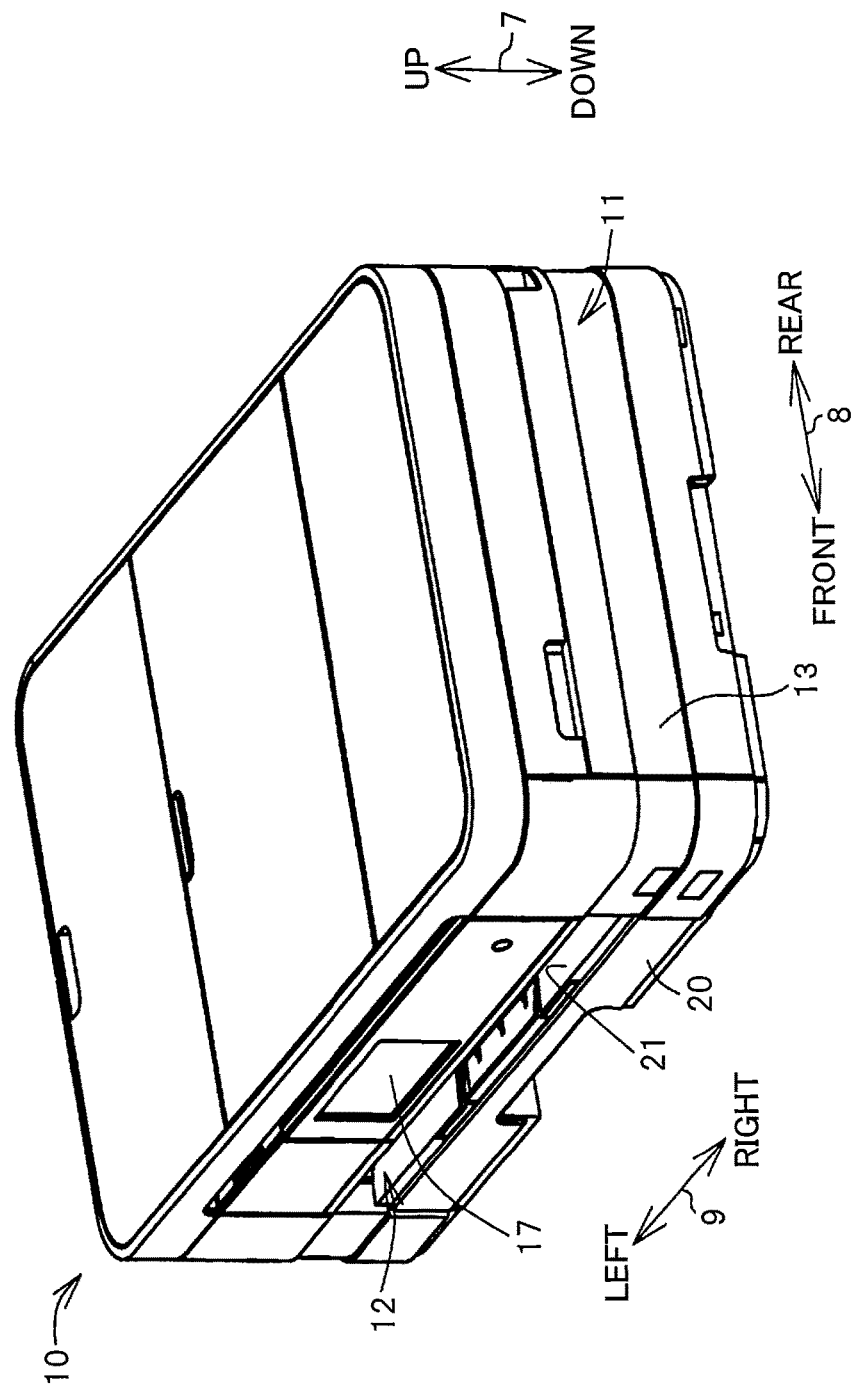
FIG. 1 is perspective view of a multi-function device according to an embodiment.

Hereinafter, a multi-function device 10 as an example of a sheet-feeding device according to an embodiment of the present disclosure will be described with reference to accompanying drawings, wherein like parts and components are designated by the same reference numerals to avoid duplicating description.

In the following description, an up-down direction 7 is defined assuming that the multi-function device 10 is disposed in an orientation in which it is intended to be used (a state illustrated in FIG. 1). A front-rear direction 8 is defined assuming that the side of the multi-function device 10 at which an opening 12 is formed (left side in FIG. 1) is a front side of the multi-function device 10. A left-right direction 9 will be based on perspective of a user facing the front side of the multi-function device 10.

As illustrated in FIG. 1, the multi-function device 10 has a generally flat rectangular parallelepiped shape. The multi-function device 10 provides various functions such as facsimile function, reading function by a scanner, and printing function. As the printing function, an inkjet image-recording system is employed to record image on a surface of a recording sheet. Alternatively, the multi-function device 10 may be provided with a double-sided printing function to record an image on both surfaces of the recording sheet.

A printer portion 11 is positioned at a lower portion of the multi-function device 10.

Figure 2:
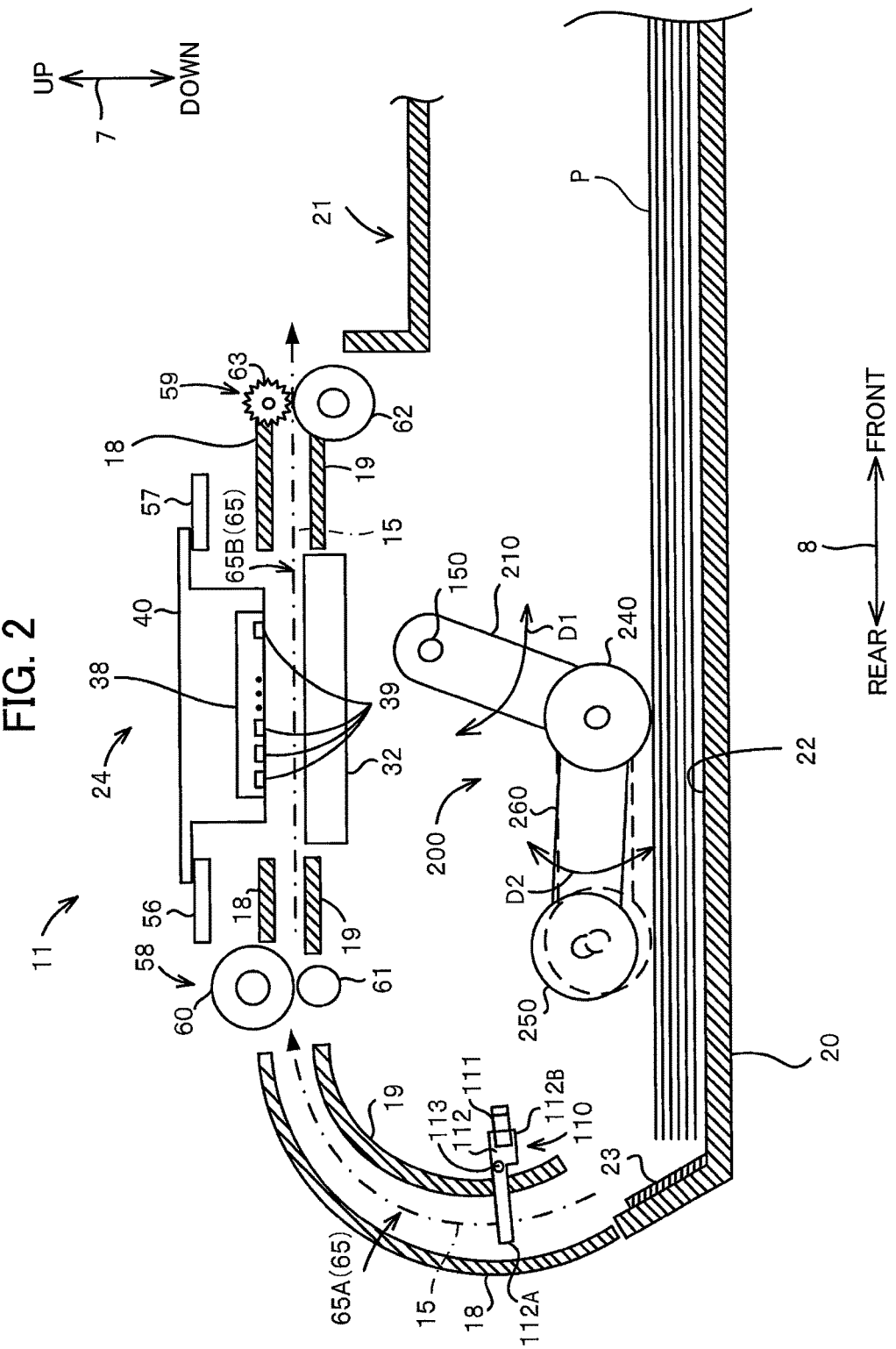
FIG. 2 is a schematic vertical cross-sectional view illustrating an internal construction of a printer portion of the multi-function device according to the embodiment.

As illustrated in FIG. 2, the printing portion 11 includes a sheet-feeding portion 200, a conveying-roller pair 58, a discharging-roller pair 59, a support member 32, and a recording portion 24. The sheet-feeding portion 200 is configured to feed each recording sheet P onto a conveying path 65. The conveying-roller pair 58 is configured to convey the recording sheet P fed to the conveying path 65. The discharging-roller pair 59 is configured to discharge the recording sheet P to a discharge tray 21. The support member 32 is configured to support the recording sheet P conveyed along the conveying path 65. The recording portion 24 is configured to record an image onto the recording sheet P supported on the support member 32. Details of the sheet-feeding portion 200 will be described later.

<Sheet Tray 20>

As illustrated in FIG. 1, the printing portion 11 includes a housing 13. The housing 13 has a front portion in which the opening 12 is formed. A sheet tray 20 is movable in the front-rear direction 8 so as to be inserted into and removed from the housing 13 of the printer portion 11 through the opening 12. The sheet tray 20 is a box-shaped member with an open top. As illustrated in FIG. 2, a stack of recording sheets P is supported on a bottom plate 22 of the sheet tray 20. The discharge tray 21 is supported at a position above a front portion of the sheet tray 20. The discharge tray 21 is movable in the front-rear direction 8 along with the sheet tray 20. Onto an upper surface of the discharge tray 21, the recording sheet P having an image recorded thereon by the recording portion 24 (described later) is configured to be discharged. Incidentally, the discharge tray 21 may be supported by the printing portion 11.

An inclined separation plate 23 for separating the recording sheets P is disposed at a rear end portion of the sheet tray 20 to extend therefrom diagonally upward and rearward. The inclined separation plate 23 functions to separate an uppermost sheet P from a remainder of the stack of the recording sheets P in case that a plurality of recording sheets P is fed by the sheet-feeding portion 200. The inclined separation plate 23 has a surface configured to contact the recording sheet P, the surface having a high friction coefficient.

<Operation Interface 17>

As illustrated in FIG. 1, an operation interface 17, such as a touch panel, is provided at an upper-front portion of the multifunction peripheral 10. A user can operate the operation interface 17 to input information necessary for printing. The multifunction peripheral 10 is configured to record an image on each recording sheet P based on the information inputted by the user. Incidentally, the multifunction peripheral 10 may be configured to record an image based on information inputted from an external device connected to the multi-function peripheral 10 through a communication line (either wired or wireless).

<Conveying Path 65>

As illustrated in FIG. 2, the conveying path 65 extends from the rear end portion of the sheet tray 20. The conveying path 65 includes a curved portion 65A and a straight portion 65B. The curved portion 65A extends upward while curving such that an outer curved surface faces rearward and an inner curve surface faces frontward. The straight portion 65B extends in the front-rear direction 8.

Specifically, the conveying path 65 is defined by an outer guide member 18 and an inner guide member 19 opposing each other with a predetermined gap provided therebetween. The recording sheet P fed from the sheet tray 20 to the conveying path 65 by the sheet-feeding portion 200 is configured to be conveyed upward along the curved portion 65A while making a U-turn, and is then configured to be conveyed to the recording portion 24 while passing the straight portion 65B. After the recording portion 24 performs image recording on the recording sheet P, the recording sheet P is conveyed along the straight portion 65B to be discharged onto the discharge tray 21. A direction in which the recording sheet P is conveyed in this way will be referred to as a sheet-feeding direction 15 (indicated by a dashed-dotted arrow in FIG. 2), hereinafter.

<Recording Portion 24>

Figure 5:
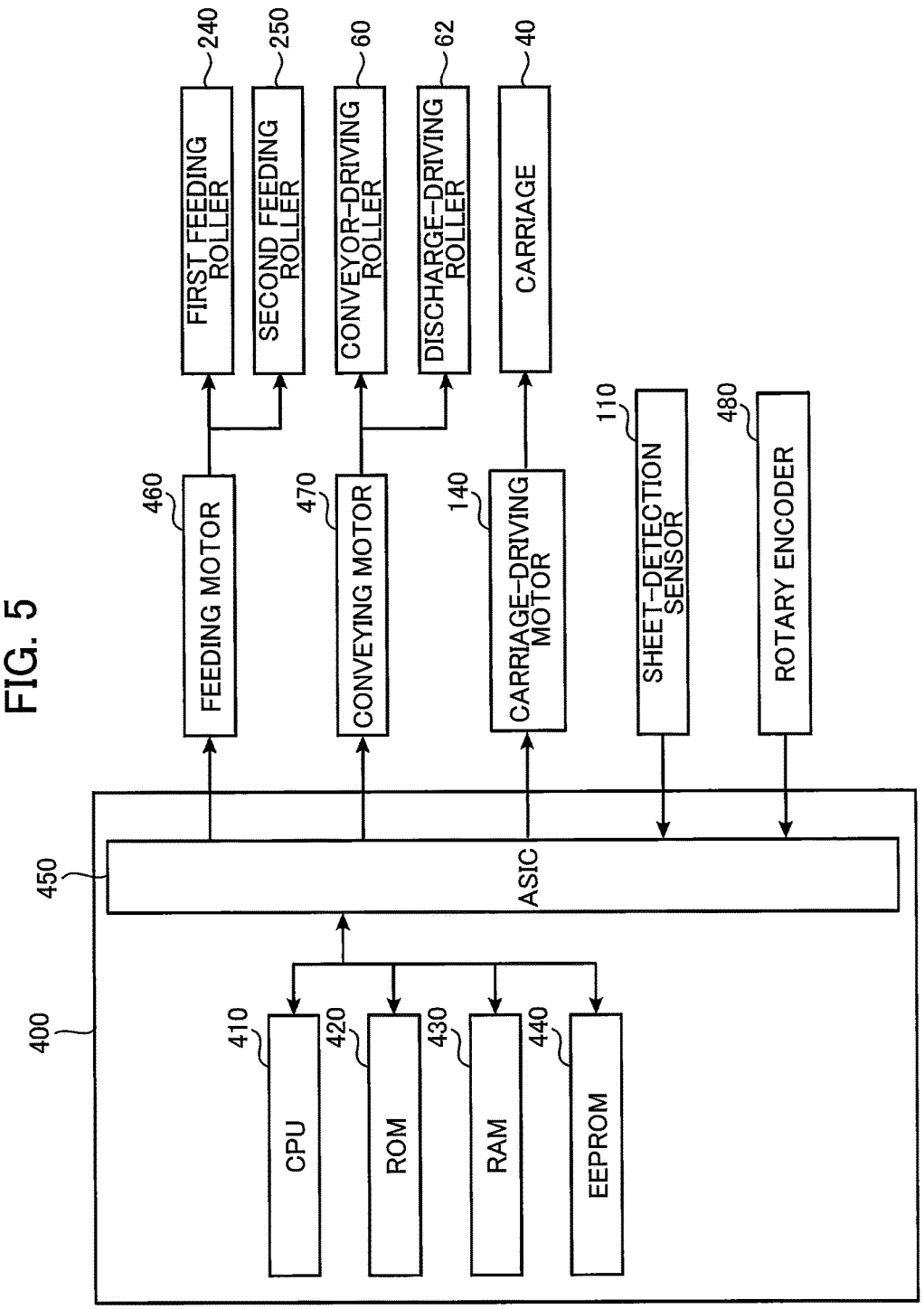
FIG. 5 is a diagram illustrating an internal structure of a controller of the multi-function device according to the embodiment.

As illustrated in FIG. 2, the recording portion 24 is provided above the straight portion 65B of the conveying path 65 (more specifically, above the support member 32). The recording portion 24 includes a carriage 40 and a recording head 38. The carriage 40 is supported by a first guide rail 56 and a second guide rail 57 inside the printing portion 11. The first guide rail 56 and the second guide rail 57 extend in the left-right direction 9. The first guide rail 56 and the second guide rail 57 are disposed to be spaced apart from each other with a predetermined gap provided therebetween in the front-rear direction 8. The carriage 40 spans across the two guide rails 56 and 57 so as to be movable in the left-right direction 9 over and along the two guide rails 56 and 57. The carriage 40 is configured to move upon receipt of a driving force from a carriage-driving motor 140 (FIG. 5).

The recording head 38 is mounted on the carriage 40. Ink is configured to be supplied to the recording head 38 from an ink cartridge (not illustrated) storing ink. A plurality of nozzles 39 are formed in a lower surface of the recording head 38. The recording head 38 is configured to discharge ink droplets through the nozzles 39 toward the support member 32 while the carriage 40 makes reciprocating movements in the left-right direction 9. The recording sheet P conveyed in the sheet-feeding direction 15 is supported on the support member 32

In this manner, while the carriage 40 makes reciprocating movements in the left-right direction 9, ink droplets are configured to be discharged through the nozzles 39 formed in the recording head 38 toward the recording sheet P conveyed onto the support member 32 along the straight portion 65B. Thus, an image is recorded on the recording sheet P.

<Conveying-Roller Pair 58, Discharging-Roller Pair 59>

As illustrated in FIG. 2, the conveying-roller pair 58 is provided upstream relative to the support member 32 in the sheet-feeding direction 15 along the conveying path 65. The conveying-roller pair 58 includes a conveyor-driving roller 60 and a pinch roller 61. The conveyor-driving roller 60 is disposed upward of the conveying path 65, while the pinch roller 61 is disposed downward of the conveying path 65 to oppose the conveyor-driving roller 60. The pinch roller 61 is in pressure contact with a roller surface of the conveyor-driving roller 60 by a resilient member (not illustrated), such as a spring.

As illustrated in FIG. 2, the discharging-roller pair 59 is provided downstream relative to the support member 32 in the sheet-feeding direction 15 along the conveying path 65. The discharging-roller pair 59 includes a discharge-driving roller 62 and a spur 63. The discharge-driving roller 62 is disposed downward relative to the conveying path 65, while the spur 63 is disposed upward relative to the conveying path 65 to oppose the discharge-driving roller 62. The spur 63 is in pressure contact with a roller surface of the discharge-driving roller 62 by a resilient member (not illustrated), such as a spring.

The conveyor-driving roller 60 and the discharge-driving roller 62 are configured to rotate in response to receipt of a rotational driving force transmitted thereto from a conveying motor 470 (FIG. 5) through a driving-force transmission mechanism (not illustrated). As the conveyor-driving roller 60 rotates with the recording sheet P nipped by the conveying-roller pair 58 (between the conveyor-driving roller 60 and pinch roller 61), the recording sheet P is conveyed by the conveying-roller pair 58 in the sheet-feeding direction 15 to move over the support member 32. As the discharge-driving roller 62 rotates with the recording sheet P nipped by the discharging-roller pair 59 (between the discharge-driving roller and the spur 63), the recording sheet P is then conveyed by the discharging-roller pair 59 in the sheet-feeding direction 15 to be discharged onto the discharge tray 21. In this manner, each of the conveying-roller pair 58 and the discharging-roller pair 59 is configured to nip the recording sheet P to convey the recording sheet P in the sheet-feeding direction 15.

<Sheet-Detection Sensor 110>

As illustrated in FIG. 2, the printing portion 11 also includes a sheet-detection sensor 110. The sheet-detection sensor 110 is provided at a predetermined position along the curved portion 65A. The sheet-detection sensor 110 is configured to detect whether the recording sheet P is at the predetermined position, and output a signal (detection signal) indicative of a result of the detection. For example, the sheet-detection sensor 110 may output a high-level signal while a portion of recording sheet is passing through the sheet-detection sensor 110; the sheet-detection sensor 110 may output a low-level signal while no recording sheet P is passing through the sheet-detection sensor 110.

The sheet-detection sensor 110 includes a pivot member 112, and an optical sensor 111 such as a photo-interrupter. The pivot member 112 includes probes 112A and 112B. Specifically, the probe 112A is provided on one end of the pivot member 112, while the probe 112B is provided on another end of the pivot member 112. The pivot member 112 is pivotable about an axis of a shaft 113. The probe 112A is arranged to protrude into the conveying path 65 from the shaft 113, as illustrated in FIG. 2.

The optical sensor 111 includes a light-emitting element (e.g., light-emitting diode) configured to emit light, and a light-receiving element (e.g., phototransistor) configured to receive the light emitted by the light-emitting element.

While the recording sheet P is conveyed along the conveying path 65A from the sheet tray 20, a leading end of the recording sheet P (i.e., a downstream end in the sheet-feeding direction 15) abuts on the probe 112A of the pivot member 112 and pushes the probe 112A. As the probe 112A is pushed by the recording sheet P being conveyed, the probe 112B of the pivot member 112 is displaced from an optical path between the light-emitting element and the light-receiving element, thereby allowing the light emitted from the light-emitting element to reach the light-receiving element along the optical path. At this time, the light-receiving element therefore outputs a high-level signal.

When a trailing end of the recording sheet P (an upstream end in the sheet-feeding direction 15) moves past the probe 112A of the pivot member 112 as the recording sheet P is being conveyed along the conveying path 65, the pivot member 112 returns to a state illustrated in FIG. 2. The probe 112B of the pivot member 112 thus enters into the optical path between the light-emitting element and the light-receiving element to block the light traveling along the optical path. In response, the light-receiving element outputs a low-level signal at this time. The optical sensor 111 is configured to output, as a detection signal, an electrical analog signal corresponding to an intensity of the light received by the light-receiving element. A controller 400 (see FIG. 5), which is configured to control overall operations of the multifunction peripheral 10, is configured to detect whether or not the recording sheet P is at the predetermined position based on differences in the electric signal outputted from the optical sensor 111.

While the sheet-detection sensor 110 of the depicted embodiment is a contact-type sheet detector configured to detect presence or absence of the recording sheet P depending on whether or not the recording sheet P abuts on the pivot member 112, a sheet detector according to the embodiment may not necessarily be such a contact-type sensor. For example, instead of the contact-type sheet detector, an optical sheet-detecting sensor may be used as the sheet detector. In this case, the optical sheet-detecting sensor may emit light toward the conveying path 65 to detect whether or not the recording sheet P is at the predetermined position based on changes in intensity of light reflected by a surface of the recording sheet P.

<Sheet-Feeding Portion 200>

Figure 3:
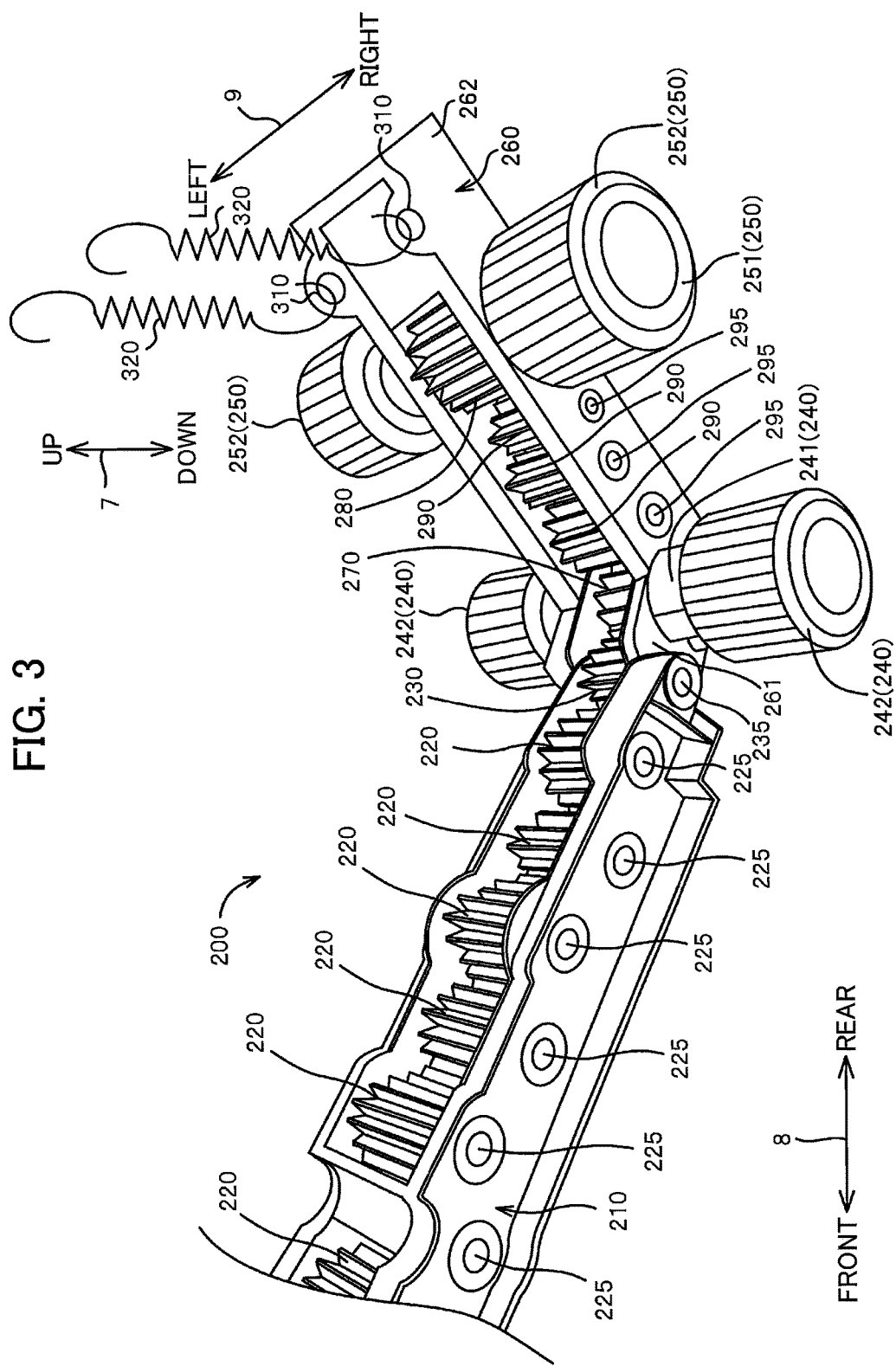
FIG. 3 is a perspective view of a sheet-feeding portion of the printer portion.

As illustrated in FIG. 2, the sheet-feeding portion 200 is provided above the sheet tray 20 and below the recording portion 24. Referring to FIG. 3, the sheet-feeding portion 200 includes a first feeding roller 240, a second feeding roller 250, a roller holder 260, and a gear holder 210. The first feeding roller 240 and the second feeding roller 250 are rotatably supported by the roller holder 260. The first feeding roller 240 and the second feeding roller 250 are configured to rotate to feed the recording sheets P stored in the sheet tray 20 rearward in the front-rear direction 8 while being in contact with each of the recording sheets P.

<Gear Holder 210>

As illustrated in FIG. 2, the gear holder 210 has an upper end portion through which a shaft 150 is inserted. The gear holder 210 is configured to pivot about the shaft 150 in directions indicated by an arrow D1. The shaft 150 is supported by a frame (not illustrated) provided in an apparatus main body. A gear 160 (see FIG. 4) is rotatably supported by the shaft 150. The gear 160 is configured to rotate about the shaft 150 extending in the left-right direction 9 upon receipt of a driving force transmitted thereto from a feeding motor 460 (see FIG. 5) via a driving-force transmission mechanism (not illustrated).

Figure 4:
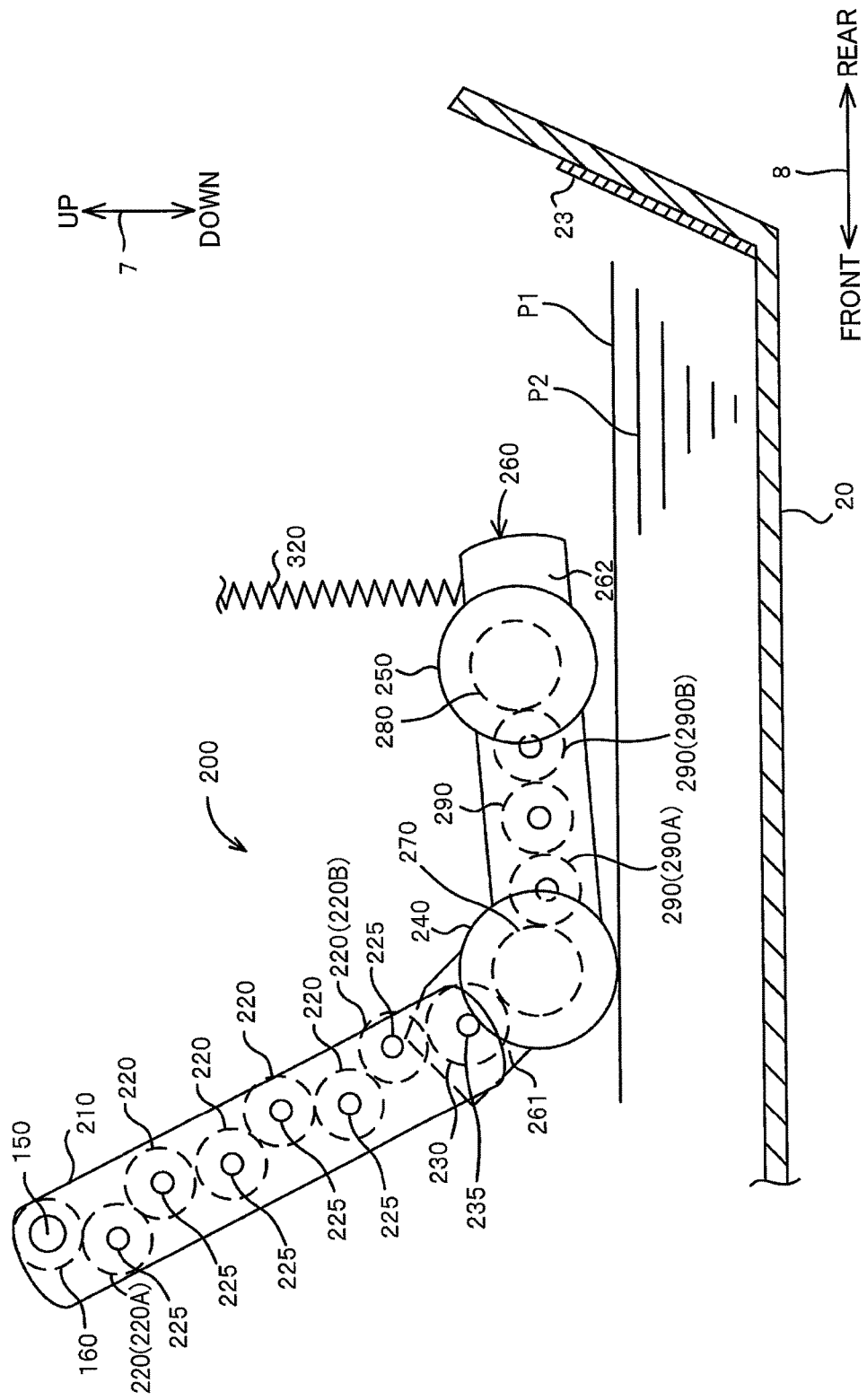
FIG. 4 is a schematic view illustrating a structure of the sheet-feeding portion of FIG. 3.

As illustrated in FIG. 3 and FIG. 4, the gear holder 210 also rotatably supports a plurality of gears 220 and a transmission gear 230. Each of the plurality of gears 220 is rotatably supported by a corresponding shaft 225 extending in the left-right direction 9. Each of the shafts 225 is inserted in corresponding holes formed in the gear holder 210, thereby being supported by the gear holder 210. The transmission gear 230 is rotatably supported by a shaft 235 extending in the left-right direction 9. The shaft 235 is inserted in holes provided in a lower end portion of the gear holder 210, thereby being supported by the gear holder 210.

As illustrated in FIG. 4, the plurality of gears 220 includes a gear 220A that is positioned uppermost, and a gear 220B that is positioned lowermost in the up-down direction 7. The uppermost gear 220A meshes with the gear 160 that is rotatable upon receipt of the driving force of the feeding motor 460. The plurality of gears 220 is thus configured to rotate upon receipt of the driving force of the feeding motor 460 through the gear 160. The plurality of gears 220 is coupled to one another while being in mesh with one another. The lowermost gear 220B meshes with the transmission gear 230. In this way, the driving force of the feeding motor 460 is transmitted to the transmission gear 230 via the gear 160 and the plurality of gears 220.

<Roller Holder 260>

As illustrated in FIG. 2, the roller holder 260 is provided rearward of the gear holder 210. The roller holder 260 is configured to pivot in directions indicated by an arrow D2. More specifically, as illustrated in FIG. 3 and FIG. 4, the roller holder 260 is substantially L-shaped, and includes a first arm portion 261 and a second arm portion 262. The first arm portion 261 extends upward and frontward, while the second arm portion 262 extends rearward. The first arm portion 261 has a hole provided therein for receiving the shaft 235 that rotatably supports the transmission gear 230. The shaft 235 is inserted into the hole in the first arm portion 261 to be supported by the first arm portion 261. The shaft 235 is inserted into the hole formed in the gear holder 210, as described above. That is, the shaft 235 is supported by both of the gear holder 210 and the roller holder 260. In other words, the gear holder 210 and the roller holder 260 are connected to each other by the shaft 235 such that the gear holder 210 and roller holder 260 are respectively pivotable about the shaft 235.

As illustrated in FIG. 3, the first feeding roller 240 includes a shaft portion 241 and a pair of roller portions 242 (described later). The shaft portion 241 is inserted in the roller holder 260 to penetrate the same in the left-right direction 9. The shaft portion 241 is formed in a cylindrical shape extending in the left-right direction 9. A first feeding gear 270 is coupled to a middle portion of the shaft portion 241 in the left-right direction 9. The first feeding gear 270 meshes with the transmission gear 230. Thus, the first feeding gear 270 is rotatable about an axis of the shaft portion 241 extending in the left-right direction 9 upon transmission of the driving force of the feeding motor 460 from the transmission gear 230. The shaft portion 241, which supports the first feeding gear 270, is configured to rotate in accordance with rotation of the first feeding gear 270. In this manner, the roller holder 260 rotatably supports the first feeding roller 240.

In the roller holder 260, the second arm portion 262 rotatably supports a plurality of gears 290. Each of the plurality of gears 290 is rotatably supported by a corresponding shaft 295 about an axis extending in the left-right direction 9. The shafts 295 are respectively inserted in holes provided in the second arm portion 262 of the roller holder 260 to be supported by the roller holder 260. As illustrated in FIG. 4, the plurality of gears 290 is connected to one another while meshing with one another. The plurality of gears 290 includes a gear 290A positioned frontmost, and a gear 290B positioned rearmost thereamong in the front-rear direction 8. The frontmost gear 290A meshes with the first feeding gear 270. The plurality of gears 290 is thus rotatable in response to transmission of the driving force of the feeding motor 460 from the first feeding gear 270.

The second feeding roller 250 includes a shaft portion 251 and a pair of roller portions 252 (described later). The shaft portion 251 penetrates through the second arm portion 262 in the left-right direction 9 at a position rearward of the plurality of gears 290. The shaft portion 251 has a cylindrical shape extending in the left-right direction 9. A second feeding gear 280 is coupled to a middle portion of the shaft portion 251 in the left-right direction 9. The second feeding gear 280 meshes with the rearmost gear 290B of the plurality of gears 290. Thus, the second feeding gear 280 is rotatable about an axis of the shaft portion 251 extending in the left-right direction 9 upon receipt of the driving force of the feeding motor 460 through the plurality of gears 290. In accordance with rotation of the second feeding gear 280, the shaft portion 251 supporting the second feeding gear 280 is caused to rotate. In this manner, the roller holder 260 rotatably supports the second feeding roller 250.

As illustrated in FIG. 3, in the roller holder 260, the second arm portion 262 has a rear end portion in which a pair of hooking holes 310 is formed. The hooking holes 310 are arranged in pair to oppose each other in the left-right direction 9. A coil spring 320 is hooked to each of the hooking holes 310. Specifically, each of the coil springs 320 has a lower end in the up-down direction 7 that is hooked to a corresponding one of the hooking holes 310. An upper end of each coil spring 320 is hooked to a frame (not illustrated) of the apparatus main body. The roller holder 260 is urged upward by urging forces of the coil springs 320 such that a free end portion (rear end portion) of the second arm portion 262 is positioned higher relative to a free end portion (front end portion) of the first arm portion 261. The roller holder 260 thus assumes an inclined posture illustrated in FIGS. 3 and 4. In the inclined posture, as illustrated in FIG. 4, the second feeding roller 250 is spaced apart from the recording sheets P (uppermost sheet P1) stacked on the sheet tray 20, while the first feeding roller 240 alone is in abutment with the recording sheets P (uppermost sheet P1).

<First Feeding Roller 240>

As illustrated in FIG. 3, the first feeding roller 240 is supported by the roller holder 260. The first feeding roller 240 is rotatable about the axis of the shaft portion 241 extending in the left-right direction 9. The first feeding roller 240 includes the shaft portion 241 and the pair of roller portions 242. As described above, the shaft portion 241 has a cylindrical shape elongated in the left-right direction 9 and penetrates through the roller holder 260 in the left-right direction 9. The roller portions 242 are provided on an outer peripheral surface of the shaft portion 241 each at each end portion of the shaft portion 241 in the left-right direction 9. The roller portions 242 are thus positioned outside the roller holder 260 in the left-right direction 9. The roller portions 242 are formed of a material having a high friction coefficient, such as rubber. The first feeding roller 240 is configured to rotate upon receipt of the driving force of the feeding motor 460 transmitted through the gear 160, the plurality of gears 220, and the transmission gear 230. The first feeding roller 240 is configured to rotate to feed each of the recording sheets P stacked on the sheet tray 20 rearward (i.e., in the sheet-feeding direction 15) with a frictional force produced between the recording sheet P (the uppermost sheet P1) and the roller portions 242.

<Second Feeding Roller 250>

As illustrated in FIG. 3, the second feeding roller 250 is supported by the roller holder 260 at a position rearward of the first feeding roller 240. The second feeding roller 250 is rotatable about an axis extending in the left-right direction 9. The second feeding roller 250 includes the shaft portion 251 and the pair of roller portions 252. As described above, the shaft portion 251 has a cylindrical shape elongated in the left-right direction 9 and penetrates through the roller holder 260 (second arm portion 262) in the left-right direction 9. The roller portions 252 are provided on an outer peripheral surface of the shaft portion 251 each at each end portion of the shaft portion 251 in the left-right direction 9. The roller portions 252 are thus positioned outside the roller holder 260 in the left-right direction 9. The roller portions 252 are formed of a material having a high friction coefficient, such as rubber. The second feeding roller 250 is rotatable upon receipt of the driving force of the feeding motor 460 transmitted through the plurality of gears 290. The second feeding roller 250 is movable between a non-feeding position illustrated in FIG. 4 and a feeding position illustrated in FIG. 9, as will be described later. In the non-feeding position, the second feeding roller 250 is spaced apart from the recording sheets P (uppermost sheet P1). In the feeding position, the roller portions 252 are in contact with the recording sheet P (uppermost sheet P1). The second feeding roller 250 at the feeding position is configured to rotate to feed each recording sheet P rearward, together with the first feeding roller 240, with a frictional force produced between each recording sheet P (uppermost sheet P1) and the roller portions 252.

<Rotary Encoder 480>

As illustrated in FIG. 5, the multifunction peripheral 10 includes a rotary encoder 480. The rotary encoder 480 is coupled to a shaft (not illustrated) of the feeding motor 460. The rotary encoder 480 includes a well-known encoder disk (not illustrated), and a well-known optical sensor (not illustrated). The encoder disk is rotatable together with the shaft of the feeding motor 460. The encoder disk is formed with a plurality of transmissive portions configured to transmit light and a plurality of non-transmissive portions configured not to transmit light. The transmissive portions and the nontransmissive portions are arranged alternately at an equal pitch in a circumferential direction of a circle concentric to the encoder disk. The optical sensor is provided to oppose a portion of the encoder disk, the portion being formed with a pattern configured of the transmissive portions and the nontransmissive portions. The optical sensor is configured to generate pulse signals based on the pattern formed in the encoder disk while the encoder disk rotates together with the shaft of the feeding motor 460. The generated pulse signals are configured to be outputted to the controller 400 from the optical sensor.

<Controller 400>

The controller 400 is configured to control the overall operations of the multifunction peripheral 10. As illustrated in FIG. 5, the controller 400 is configured as a microcomputer that primarily includes a CPU 410, a ROM 420, a RAM 430, an EEPROM 440, and an ASIC 450. These elements are connected by an internal bus.

The ROM 420 stores programs to enable the CPU 410 to control various operations. The RAM 430 may serve as a storage area for temporarily storing data and signals that may be necessary for execution of the programs by the CPU 410, or as a work area for data processing. The EEPROM 440 stores settings and flags that should be stored after the multifunction peripheral 10 is shut off.

The ASIC 450 is connected to the feeding motor 460, the conveying motor 470, and the carriage-driving motor 140. When a drive signal for rotating each motor is inputted to a corresponding drive circuit from the CPU 410, a driving current corresponding to the drive signal is configured to be outputted to the corresponding motor from the drive circuit. Each of these motors 460, 470 and 140 is thus rotatable in a forward direction or a reverse direction at a predetermined rotation speed. In other words, the controller 400 is configured to control rotations (driving) of each of the feeding motor 460, the conveying motor 470, and the carriage-driving motor 140.

The pulse signals outputted from the optical sensor of the rotary encoder 480 are configured to be inputted to the ASIC 450. The controller 400 is configured to calculate the rotation speed of the feeding motor 460 by counting the number of edges of the pulse signals inputted from the optical sensor. In other words, the controller 400 can perform controlling driving of the feeding motor 460. For example, the controller 400 may stop driving the feeding motor 460 when the number of the counted edges of the pulse signals reaches a number that indicates a prescribed target rotation speed. Thus, by controlling the rotation of the feeding motor 460, the controller 400 can control rotations of the first feeding roller 240 and the second feeding roller 250 that are configured to be driven by the feeding motor 460.

The ASIC 450 is also connected to the optical sensor 111 of the sheet-detection sensor 110. Electric signals from the optical sensor 111 are thus configured to be inputted to the controller 400. The controller 400 is configured to determine whether or not the inputted electric signal provides an electrical level (a voltage value or a current value) equal to or greater than a predetermined value. The controller 400 is configured to determine that the inputted electrical level is a high-level signal in case that the electrical level of the inputted electric signal is equal to or greater than the predetermined value, and that the inputted electric signal is a low-level signal in case that the electrical level is lower than the predetermined value.

In case that the inputted electric signal is determined to be a high level signal (i.e., the sheet-detection sensor 110 is rendered ON), the controller 400 determines that the leading end of the recording sheet P has passed through the pivot member 112 but the trailing end of the recording sheet P has not yet passed through the pivot member 112. On the other hand, in case that the inputted electric signal is determined to be a low level signal (i.e., the sheet-detection sensor 110 is rendered OFF), the controller 400 determines that: the leading end of the recording sheet P has not reached the pivot member 112; or that the trailing end of the recording sheet P has already passed through the pivot member 112.

<Sheet-Feeding Process>

Hereinafter, procedures of a sheet-feeding process executed by the controller 400 will be described with reference to a flowchart of FIG. 6. Also, operations of the sheet-feeding portion 200 during the sheet-feeding process will be described with reference to FIGS. 4 through 9. Hereinafter, the second feeding roller 250 is assumed to be at the non-feeding position shown in FIG. 4, as an initial position.

Figure 6:
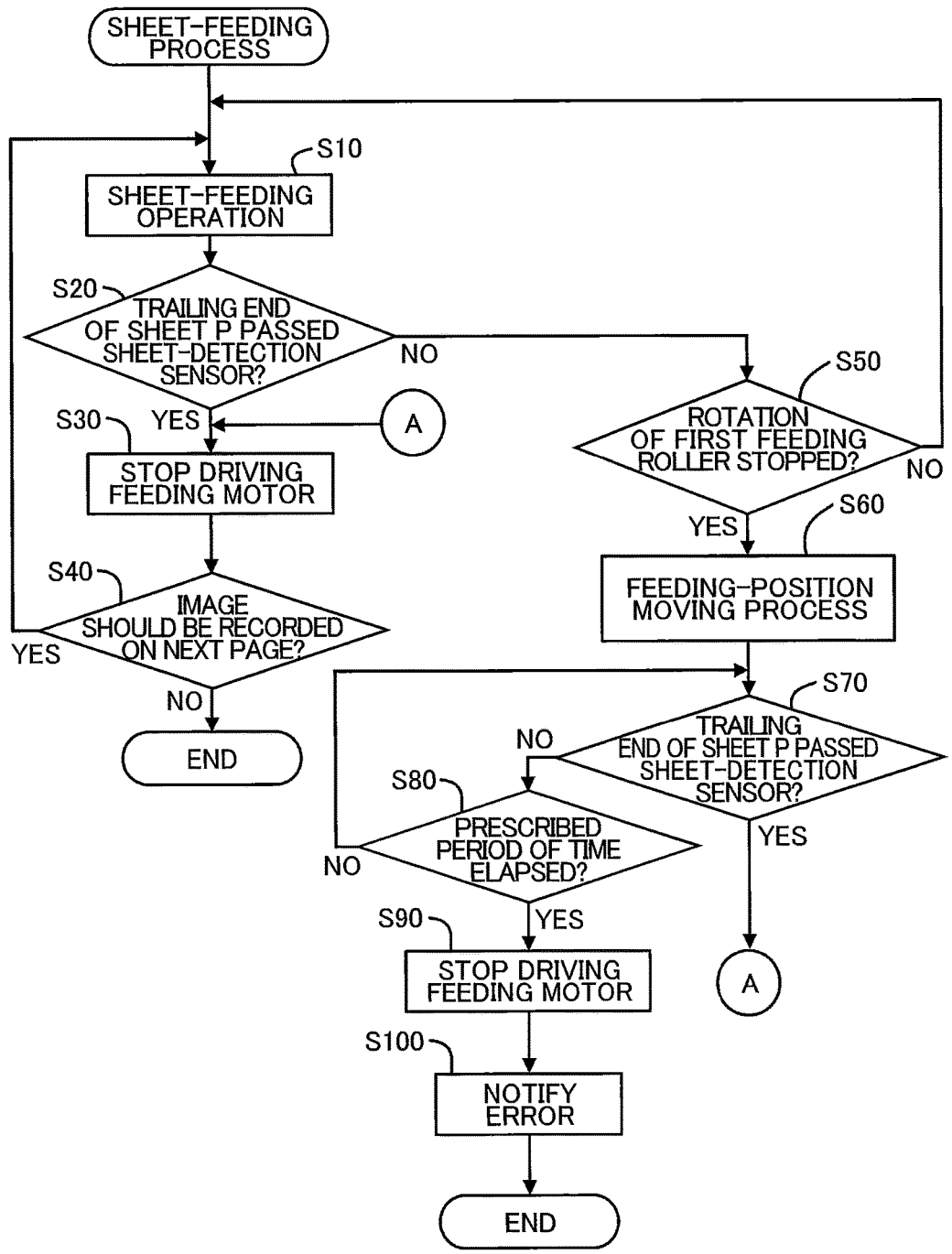
FIG. 6 is a flowchart illustrating steps of a sheet-feeding process executed by the controller of the multi-function device according to the embodiment.

The controller 400 is configured to start executing the sheet-feeding process of FIG. 6 in response to acquiring, through the operation interface 17 or a communication circuit, an image-recording instruction to record an image on a recording sheet P. Here, the image-recording instruction includes print information necessary for executing an image-recording operation. The print information may include some or all of the followings: the number of pages required for recording an image(images) that should be recorded on the recording sheet(s) P (hereinafter, to be referred to as "target image" or "target images"); image data of the target image(s); resolution of the image data; size of the recording sheets P; orientation of the recording sheets P; and information indicative of whether back-side printing should be performed.

Referring to FIG. 6, upon receiving the image-recording instruction, the controller 400 executes a sheet-feeding operation in S10. Specifically, in S10, the controller 400 is configured to output a drive signal to the drive circuit of the feeding motor 460. In response to receipt of the drive signal, the drive circuit is configured to output a driving current of a magnitude corresponding to the drive signal to the feeding motor 460, thereby driving the feeding motor 460. Here, the driving current outputted into the feeding motor 460 in S10 by the controller 400 through the corresponding drive circuit is defined as a driving current of a value V1 (hereinafter, to be referred as a "first driving current V1"). In other words, the controller 400 is configured to drive the feeding motor 460 with the first driving current V1 in S10.

The driving force of the feeding motor 460, which is being driven at the first driving current V1, is transmitted to the first feeding roller 240 via the gear 160, the plurality of gears 220, the transmission gear 230, and the first feeding gear 270 as described above, and is also transmitted to the second feeding roller 250 via the first feeding gear 270, the plurality of gears 290, and the second feeding gear 280. Thus, the first feeding roller 240 and the second feeding roller 250 are caused to rotate, thereby feeding the recording sheets P stacked on the sheet tray 20. At this time, since the roller holder 260 is urged upward by the coil springs 320 to place the second feeding roller 250 at the non-feeding position, the second feeding roller 250 is separated away from the recording sheets P (uppermost sheet P1), as illustrated in FIG. 4. As a result, although both of the first feeding roller 240 and the second feeding roller 250 are caused to rotate in response to driving of the feeding motor 460 in S10, only the first feeding roller 240, which is in contact with the recording sheets P, is configured to execute the sheet-feeding operation in S10 since the second feeding roller 250 is separated from the recording sheets P (uppermost sheet P1).

Subsequently, in S20, the controller 400 determines whether or not the trailing end of the recording sheet P (uppermost sheet P1) fed by the first feeding roller 240 in S10 has passed through the sheet-detection sensor 110 based on the signals outputted from the sheet-detection sensor 110. Specifically, in S20, the controller 400 first determines that the leading end of the recording sheet P has reached the sheet-detection sensor 110 based on the change in the detection signal outputted from the sheet-detection sensor 110 from low level to high level. In the meantime, the recording sheet P is conveyed further rearward and upward along the conveying path 65 by the first feeding roller 240. The controller 400 then determines that the trailing end of the recording sheet P has passed through the sheet-detection sensor 110 based on the change in the detection signal outputted from the sheet-detection sensor 110 from high level to low level.

Upon detecting that the trailing end of the recording sheet P has passed through the sheet-detection sensor 110 (S20: YES), the controller 400 determines that the sheet-feeding operation is completed for a single recording sheet P. The controller 400 then stops outputting the drive signal to the drive circuit of the feeding motor 460 to stop driving the feeding motor 460 in S30. In other words, in S30, the controller 400 stops the rotations of the first feeding roller 240 and the second feeding roller 250.

The controller 400 then determines in S40 whether or not there is another target image to be recorded on a next page of the recording sheet P. If there is another target image to be recorded on the next page (S40: YES), the controller 400 returns to the step S10 to execute the sheet-feeding operation for the next recording sheet P. In case that there is no more target image to be recorded on the next page (S40: NO), the controller 400 ends the sheet-feeding process.

On the other hand, in case that the controller 400 determines in S20 that the trailing end of the recording sheet P has not passed through the sheet-detection sensor 110 (S20: NO), the controller 400 then determines in S50 whether or not the first feeding roller 240 stops rotating. Specifically, in S50, the controller 400 calculates the rotation speed of the feeding motor 460 based on the signals outputted from the rotary encoder 480. If the rotation speed of the feeding motor 460 is calculated to be zero, the controller 400 determines in S50 that the rotation of the first feeding roller 240 is stopped.

Figure 7:
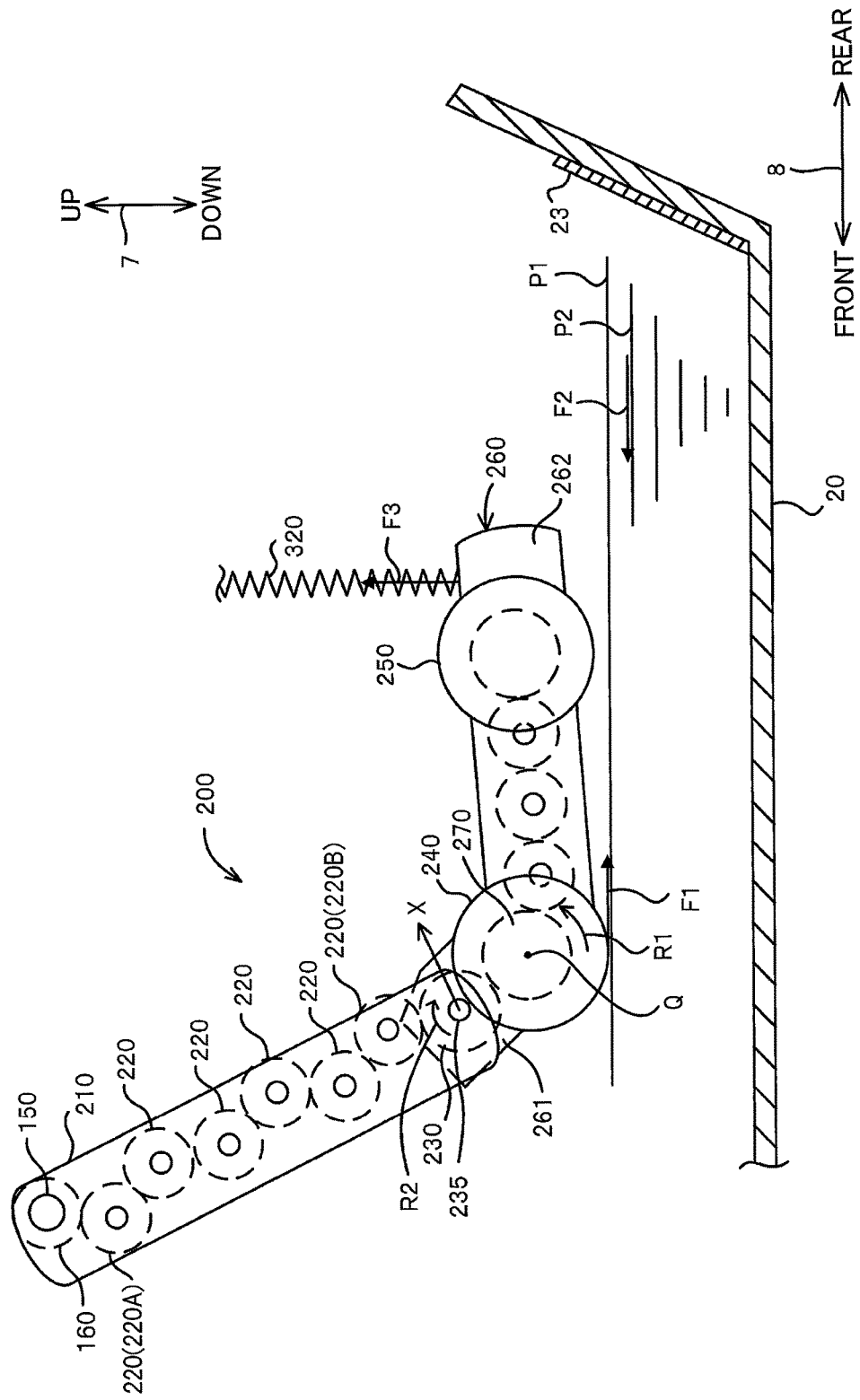
FIG. 7 is a schematic view of the sheet-feeding portion in a state where a second feeding roller is at a non-feeding position.

Normally, referring to FIG. 7, the first feeding roller 240 is configured to rotate in a counterclockwise direction R1 upon receiving the driving force from the feeding motor 460, and feed the uppermost sheet P1 of the recording sheets P stacked on the sheet tray 20 rearward. At this time, the first feeding roller 240 feeds the uppermost sheet P1 with a rearward sheet-conveyance force F1 produced by the frictional force generated between the uppermost sheet P1 and outer peripheral surfaces of the roller portions 242 of the first feeding roller 240. In the meantime, while being fed by the first feeding roller 240, the uppermost sheet P1 is also applied with an inter-sheet frictional force F2 that is generated between the uppermost sheet P1 and a recording sheet P2 stacked immediately below the uppermost sheet P1 (hereinafter, to be referred to as "second uppermost sheet P2"). The inter-sheet frictional force F2 is a frictional force generated between surfaces of the uppermost sheet P1 and the second uppermost sheet P2 that rub against each other. The inter-sheet frictional force F2 acts in a forward direction, which is opposite to the direction in which the sheet-conveyance force F1 acts (rearward direction). In other words, the inter-sheet frictional force F2 is a force offsetting (cancelling) the sheet-conveyance force F1. Magnitude of the inter-sheet frictional force F2 may vary depending on friction coefficients of the rubbing surfaces of the uppermost sheet P1 and the second uppermost sheet P2. For example, a recording sheet having a larger surface friction coefficient, such as glossy paper, may result in a greater inter-sheet frictional force F2. Since the inter-sheet frictional force F2 compensates the sheet-conveyance force F1, the first feeding roller 240 stops rotating if the inter-sheet frictional force F2 becomes greater than the sheet-conveyance force F1. In case that the first feeding roller 240 stops rotating, the uppermost sheet P1 cannot be fed, resulting in failure in sheet feeding of the uppermost sheet P1.

If the controller 400 determines in S50 that the first feeding roller 240 has not yet stopped rotating, that is, that the first feeding roller 240 is rotating (S50: NO), the controller 400 determines that the sheet-feeding operation by the first feeding roller 240 is in progress, and returns to the step S10. The controller 400 repeats the loop of steps S10, S20: NO and S50: NO until the trailing end of the recording sheet P (uppermost sheet P1) is determined to pass through the sheet-detection sensor 110 (S20:YES), or until the rotation of the first feeding roller 240 is determined to be stopped (S50: YES).

Figure 9:
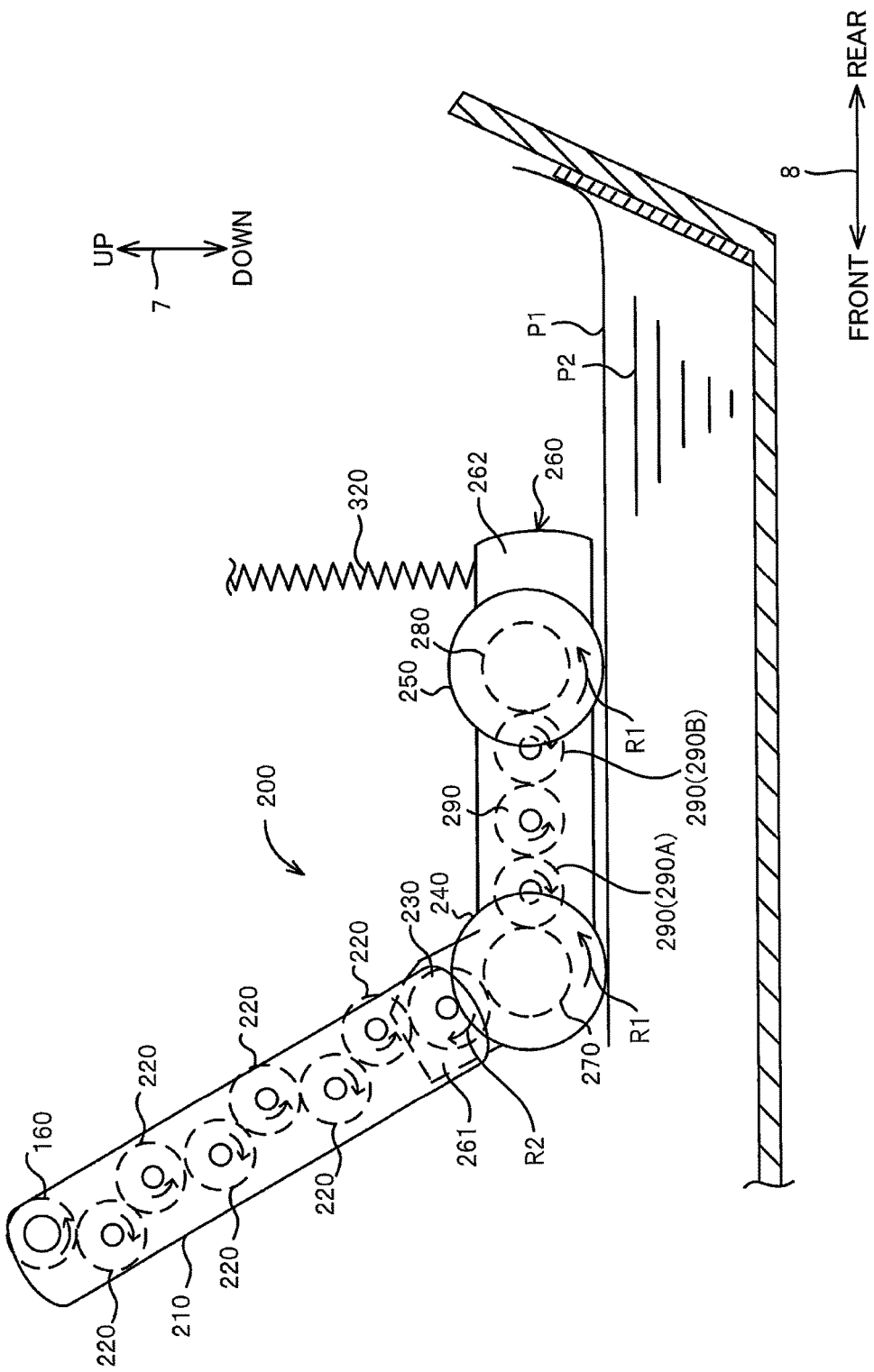
FIG. 9 is a schematic view of the sheet-feeding portion in a state where the second feeding roller is at the feeding position.

When the controller 400 determines in S50 that the first feeding roller 240 has stopped rotating (S50: YES), the controller 400 executes a feeding-position moving process in S60. In the feeding-position moving process, the second feeding roller 250 is caused to move from the non-feeding position (see FIG. 7) to the feeding position (see FIG. 9). At the non-feeding position, the second feeding roller 250 is separated away from the uppermost sheet P1 (FIG. 7). At the feeding position, the second feeding roller 250 is in contact with the uppermost sheet P1 (FIG. 9).

Figure 8:
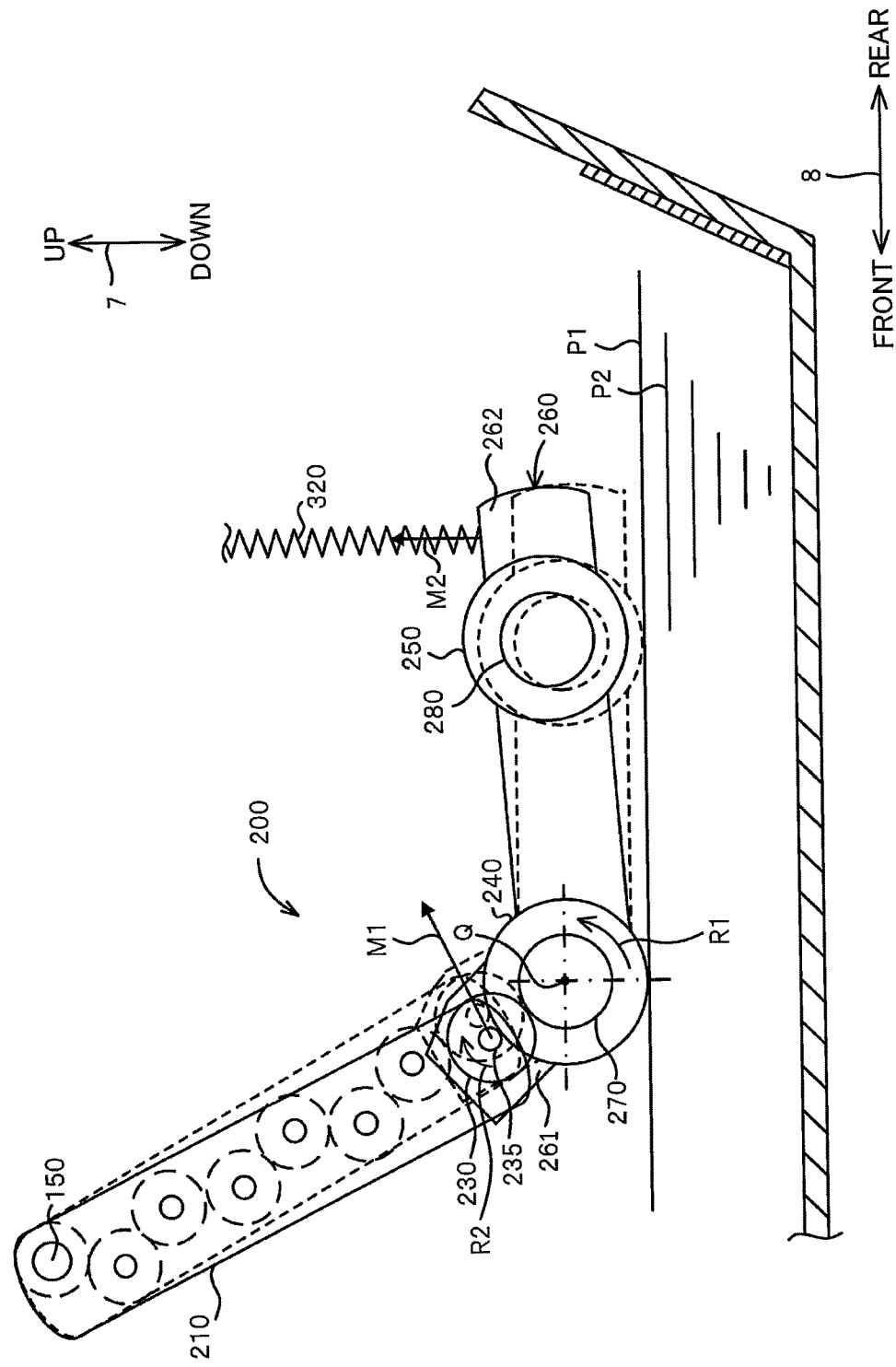
FIG. 8 is a schematic view illustrating movements of the second feeding roller from the non-feeding position to a feeding position.

Hereinafter, the feeding-position moving process executed in S60 will be described with reference to FIGS. 7 to 9.

In the non-feeding position shown in FIG. 7, the transmission gear 230 rotates in a clockwise direction R2 to rotate the first feeding roller 240 in the counterclockwise direction R1. Specifically, at this time, the transmission gear 230 rotates in the clockwise direction R2 with a torque that acts in the clockwise direction R2 about the axis of the shaft 235 (hereinafter, referred to as "torque T1") by the driving force of the feeding motor 460 transmitted to the transmission gear 230. As described above, the feeding motor 460 is driven at the first driving current V1 by the controller 400 at this time. Hence, the torque T1 is a torque that acts on the transmission gear 230 as a result of transmission of the driving force of the feeding motor 460 driven at the first driving current V1.

In the feeding-position moving process in S60, the controller 400 raises the driving current for driving the feeding motor 460 from the first driving current V1 to a second driving current V2 whose level (value V2) is larger than the level (value V1) of the first driving current V1. As the driving force of the feeding motor 460 driven at the second driving current V2 is transmitted to the transmission gear 230, the transmission gear 230 is applied with a torque T2 acting in the clockwise direction R2 about the axis of the shaft 235. This torque T2 is greater than the torque T1, since the driving force of the feeding motor 460 driven at the second driving current V2 is larger than the driving force of the feeding motor 460 driven at the first driving current V1. In case that the inter-sheet frictional force F2 exceeds the sheet-conveyance force F1 to cause the transmission gear 230 to stop rotating, the torque T2 greater than the torque T1 is made to act on the transmission gear 230 by the feeding motor 460. Upon application of the torque T2, the transmission gear 230 moves, while rotating, in a direction indicated by an arrow X in FIG. 7 along an outer peripheral surface of the first feeding gear 270, while being engaged with the first feeding gear 270.

While the transmission gear 230 rotationally moves in the direction of the arrow X in FIG. 7 along the outer peripheral surface of the first feeding gear 270, the first feeding gear 270 remains un-rotated due to the inter-sheet frictional force F2 acting on the first feeding roller 240. The transmission gear 23 rotationally moves in the direction of the arrow X from a position indicated by a solid line in FIG. 8 to a position indicated by a dotted line in FIG. 8. In this way, in a state where the rotation of the first feeding roller 240 is halted, the transmission gear 230 does not rotate, while being in engagement with the first feeding gear 270, when the torque T1 acts on the transmission gear 230; but the transmission gear 230 rotates while moving along the outer peripheral surface of the first feeding gear 270 when the torque T2 greater than the torque T1 acts on the transmission gear 230. In other words, the controller 400 increases the level of the driving current of the feeding motor 460 from the first driving current V1 to the second driving current V2, thereby causing the transmission gear 230 to rotationally move. Since the gear holder 210 supports the transmission gear 230, the gear holder 210 pivots about the shaft 150 from a position indicated by a solid line in FIG. 8 to a position indicated by a broken line in accordance with the movement of the transmission gear 230 in the direction of the arrow X.

As described above, the roller holder 260 is connected to the gear holder 210 by the shaft 235. Therefore, by a force attributed to the movement of the gear holder 210 from the position indicated by the solid line in FIG. 8 to the position indicated by the broken line in FIG. 8, a rotational moment M1 acts on a portion of the roller holder 260 that supports the shaft 235. Specifically, referring to FIG. 8, the rotational moment M1 (hereinafter, referred to as "first rotational moment M1") acts in the clockwise direction R2 about a rotation center Q of the first feeding roller 240. The first rotational moment M1 is a force that causes the roller holder 260 to pivot in the clockwise direction R2 about the rotation center Q of the first feeding roller 240.

Since the coil springs 320 are hooked to the second arm portion 262 of the roller holder 260, the second arm portion 262 is applied with an urging force F3 from the coil springs 320, as illustrated in FIG. 7. The roller holder 260 is normally urged upward by the urging force F3. Since the free end portion of the second arm portion 262 is lifted up by the urging force F3, the second feeding roller 250 is normally maintained at the non-feeding position. That is, as illustrated in FIG. 8, due to the urging force F3, the roller holder 260 is applied with a rotational moment M2 acting in the counterclockwise direction R1 about the rotation center Q of the first feeding roller 240. The rotational moment M2 (hereinafter, referred to as "second rotational moment M2") is a force that causes the roller holder 260 to pivot in the counterclockwise direction R1 about the rotation center Q of the first feeding roller 240.

As described earlier, in the state where the rotation of the first feeding roller 240 is halted, the roller holder 260 is applied with the first rotational moment M1 (attributed to the force of the transmission gear 230 that rotationally moves along the outer peripheral surface of the first feeding gear 270) and the second rotational moment M2 (attributed to the urging force F3 of the coil springs 320). The first rotational moment M1 is the force that causes the roller holder 260 to pivot in the clockwise direction R2, while the second rotational moment M2 is the force that causes the roller holder 260 to pivot in the counterclockwise direction R1. Hence, in a case where the first rotational moment M1 is smaller than the second rotational moment M2, the roller holder 260 is caused to pivot in the counterclockwise direction R1 about the rotation center Q of the first feeding roller 240, moving to a first position indicated by a solid line in FIG. 8. When the roller holder 260 is at the first position, the second feeding roller 250 is at the non-feeding position separating away from the uppermost sheet P1. On the other hand, in a case where the first rotational moment M1 is greater than the second rotational moment M2, the roller holder 260 is caused to pivot in the clockwise direction R2 about the rotation center Q of the first feeding roller 240, moving to a second position indicated by a broken line in FIG. 8. When the roller holder 260 is at the second position, the second feeding roller 250 is at the feeding position contacting the uppermost sheet P1. Thus, when the roller holder 260 is at the second position, both of the first feeding roller 240 and the second feeding roller 250 can feed the uppermost sheet P1.

In this way, due to the torque T2 applied on the transmission gear 230 by the feeding motor 460 driven at the second driving current V2, the transmission gear 230 and gear holder 210 are caused to move, thereby moving the roller holder 260 from the first position to the second position. In other words, the torque T2 that acts on the transmission gear 230 has such a magnitude that allows the transmission gear 230 to rotationally move along the outer peripheral surface of the first feeding gear 270 against the second rotational moment M2. The controller 400 is configured to drive the feeding motor 460 at the second driving current V2 to allow the first rotational moment M1 to become greater than the second rotational moment M2, causing the roller holder 260 to move from the first position to the second position, thereby moving the second feeding roller 250 from the non-feeding position to the feeding position.

Note that, magnitude of frictional force generated between a roller and a recording sheet P may vary depending on a size of a contact area defined between the roller and the recording sheet P. Generally, the frictional force between the roller and the recording sheet P increases as the contact area increases. In other words, as the contact area between the roller and the recording sheet P is greater, the sheet-conveyance force F1 for conveying the recording sheet P also becomes greater. Therefore, as the controller 400 increases the level of the driving current of the feeding motor 460 from the first driving current V1 to the second driving current V2 in the feeding-position moving process of S60, the second feeding roller 250 moves from the non-feeding position to the feeding position, allowing the second feeding roller 250 to make contact with the uppermost sheet P1 in addition to the first feeding roller 240. The uppermost sheet P1 can thus be fed with a larger contact area, as compared to a case where the uppermost sheet P1 is fed only by the first feeding roller 240. The sheet-conveyance force F1 therefore becomes greater, as compared to the case where the uppermost sheet P1 is fed by the first feeding roller 240 alone. The sheet-conveyance force F1 can be made larger than the inter-sheet frictional force F2. As a result, as illustrated in FIG. 9, the first feeding roller 240, which has stopped rotating, is allowed to rotate again in the counterclockwise direction R1, and the second feeding roller 250, which is now in contact with the uppermost sheet P1, is also caused to rotate in the counterclockwise direction R1. The uppermost sheet P1 is thus conveyed rearward by both of the first feeding roller 240 and second feeding roller 250. Sheet-feeding failure can be thus resolved.

Returning to the flowchart of FIG. 6, after executing the feeding-position moving process in S60, the controller 400 determines in S70 whether or not the trailing end of the recording sheet P (uppermost sheet P1) has passed through the sheet-detection sensor 110. When the trailing end of the recording sheet P is determined to pass through the sheet-detection sensor 110 (S70: YES), the controller 400 determines that: the sheet-feeding failure is now resolved; and the sheet-feeding operation for a single recording sheet P (for the uppermost sheet P1) has finished. The controller 400 then goes back to the step S30 to stop rotation of the feeding motor 460 in S30.

In a state where the rotation of the feeding motor 460 is halted, no torque for rotating the transmission gear 230 acts on the transmission gear 230. The roller holder 260 is thus applied with only the second rotational moment M2 attributed to the urging force F3 of the coil springs 320. Accordingly, the roller holder 260 is caused to pivot in the counterclockwise direction R1 due to the second rotational moment M2, moving from the second position illustrated in FIG. 9 to the first position illustrated in FIG. 7. The second feeding roller 250 thus returns from the feeding position to the non-feeding position. Further, in accordance with the movement of the roller holder 260 from the second position to the first position, the transmission gear 230 and the gear holder 210 are moved back to the respective positions illustrated in FIG. 7. In this way, only the first feeding roller 240 is made in abutment with the next uppermost sheet P1 for feeding a next recording sheet P (next uppermost sheet P1), so that only the first feeding roller 240 can start feeding the next uppermost sheet P1.

In case that the controller 400 determines in S70 that the trailing end of the recording sheet P (uppermost sheet P1) has not yet passed through the sheet-detection sensor 110 (S70: NO), the controller 400 then determines in S80 whether or not a predetermined period of time has elapsed. Here, the predetermined period of time is a time duration required for the number of edges of the pulse signals outputted from the rotary encoder 480 to reach a number corresponding to a distance by which the trailing end of the recording sheet P moves from a position stacked on the sheet tray 20 to the position of the sheet-detection sensor 110.

Recording sheets P of various sizes can be used for printing by the multi-function device 10. In the controller 400 (EEPROM 440) pre-stored is information indicative of positions of respective trailing ends of such variety of sizes of recording sheets P accommodated in the sheet tray 20. Based on the size information of the recording sheet P contained in the print information, the controller 400 is configured to retrieve information on the position of the trailing end corresponding to the size. The controller 400 is further configured to obtain the rotation speed of the feeding motor 460 driven at the second driving current V2, based on the pulse signals from the rotary encoder 480 fixed to the rotation shaft of the feeding motor 460. From the rotation speed of the feeding motor 460, the controller 400 can calculate a conveying speed of the recording sheet P. The controller 400 is then configured to calculate, from the calculated conveying speed of the recording sheet P, how long it takes for the trailing end of the recording sheet P accommodated in the sheet tray 20 to reach the sheet-detection sensor 110. That is, the predetermined period of time is a time duration required for the trailing end of the recording sheet P accommodated in the sheet tray 20 to reach the sheet-detection sensor 110.

If the trailing end of the recording sheet P is determined not to have passed through the sheet-detection sensor 110 (S70: NO), the controller 400 waits until the predetermined period of time has elapsed (S80: NO). That is, the routine from S70: NO to S80: NO is repeated until the predetermined period of time is determined to have elapsed in S80. If the controller 400 determines in S80 that the predetermined period of time has elapsed before the trailing end of the recording sheet P passes through the sheet-detection sensor 110 (S70:NO, S80: YES), the controller 400 then stops driving the feeding motor 460 in S90. Here, the expression "the predetermined period of time has elapsed before the trailing end of the recording sheet P passes through the sheet-detection sensor 110" denotes a state where sheet-feeding failure cannot be resolved even though the second feeding roller 250 is moved to the feeding position as a result of executing the feeding-position moving process in S60. If this is the case, the controller 400 notifies the user that a sheet-feeding error has occurred in S100 through the operation interface 17 or a speaker (not illustrated), for example. The controller 400 then terminates the sheet-feeding process.

<Operational Advantages of the Embodiment>

According to the present embodiment, in case that a sheet-feeding failure occurs during the sheet-feeding process as a result of halt in rotation of the first feeding roller 240, the second feeding roller 250 is configured to be moved from the non-feeding position to the feeding position, thereby enabling both of the first feeding roller 240 and the second feeding roller 250 to feed the recording sheet P. With this configuration, as compared to a case where only the first feeding roller 240 performs the sheet-feeding, a larger contact area can be ensured between the recording sheet P and the rollers (first feeding roller 240 and second feeding roller 250). As a result, the recording sheet P can be fed with a greater frictional force, thereby addressing the sheet-feeding failure.

Incidentally, in order to address sheet-feeding failure, the contact area between the recording sheet P and the roller(s) (240, 250) may be enlarged to increase the conveyance force F1. However, if the sheet-conveyance force F1 is too large, a plurality of recording sheets P may be fed at a time (i.e., "multiple-feeding of sheets P"). That is, not only the uppermost sheet P but also a plurality of sheets P stacked below the uppermost sheet P1 on the sheet tray 20 may be simultaneously fed together with the uppermost sheet P1. In order to avoid such multiple-feeding, desirably, the recording sheets P should not be fed while being constantly in contact with a large contact area.

In view of the forgoing, in the present embodiment, the second feeding roller 250 is configured to move from the non-feeding position to the feeding position to increase the conveyance force F1, only when a sheet-feeding failure occurs due to a halt of rotation of the first feeding roller 240. If there is no sheet-feeding failure, only the first feeding roller 240 serves to feed the recording sheets P, while the second feeding roller 250 is held at the non-feeding position. This configuration of the present embodiment can thus reduce the likelihood of occurrence of multiple-feeding of the sheets P.

Further, in the depicted embodiment, moving the second feeding roller 250 from the non-feeding position to the feeding position can be realized by raising the value of the driving current of the feeding motor 460 from the first driving current V1 to the second driving current V2. That is, no additional driving source or mechanism is required for moving the second feeding roller 250 to the feeding position. This configuration of the embodiment can execute the feeding-position moving process (S60 of FIG. 6) to resolve non-feeding of the recording sheets P through a simple configuration, and contribute to reduction in production costs and downsizing of the multi-function device 10.

Further, the driving force of the feeding motor 460 can be transmitted from the first feeding roller 240 to the second feeding roller 250 through a gear train including the gear 290 in meshing engagement with the first feeding gear 270. Generally, the gear train is less likely to be affected by load at the time of transmission of the driving force. Accordingly, the driving force of the feeding motor 460 can be reliably transmitted to the second feeding roller 250 from the first feeding roller 240.

MODIFICATIONS

While the description has been made in detail with reference to the embodiment thereof, it would be apparent to those skilled in the art that many modifications and variations may be made therein without departing from the scope of the disclosure. Hereinafter, various conceivable modifications to the embodiment will be described.

1. First Modification

In the depicted embodiment, in case that the first feeding roller 240 stops rotating during the sheet-feeding process to cause non-feeding of the recording sheet P, the controller 400 raises the driving current of the feeding motor 460 from the first driving current V1 to the second driving current V2 in the feeding-position moving process in S60 of the sheet-feeding process of FIG. 7. Thus, the first rotational moment M1 that acts on the roller holder 260 is made to be greater than the second rotational moment M2, thereby moving the roller holder 260 from the first position (FIG. 7) to the second position (FIG. 9).

In a first modification to the embodiment, in place of the feeding-position moving process in S60 of the embodiment, the controller 400 may execute a feeding-position moving process according to the first modification during the sheet-feeding process.

Hereinafter, the sheet-feeding process according to the first modification will be described with reference to FIGS. 10 to 13.

Figure 10:
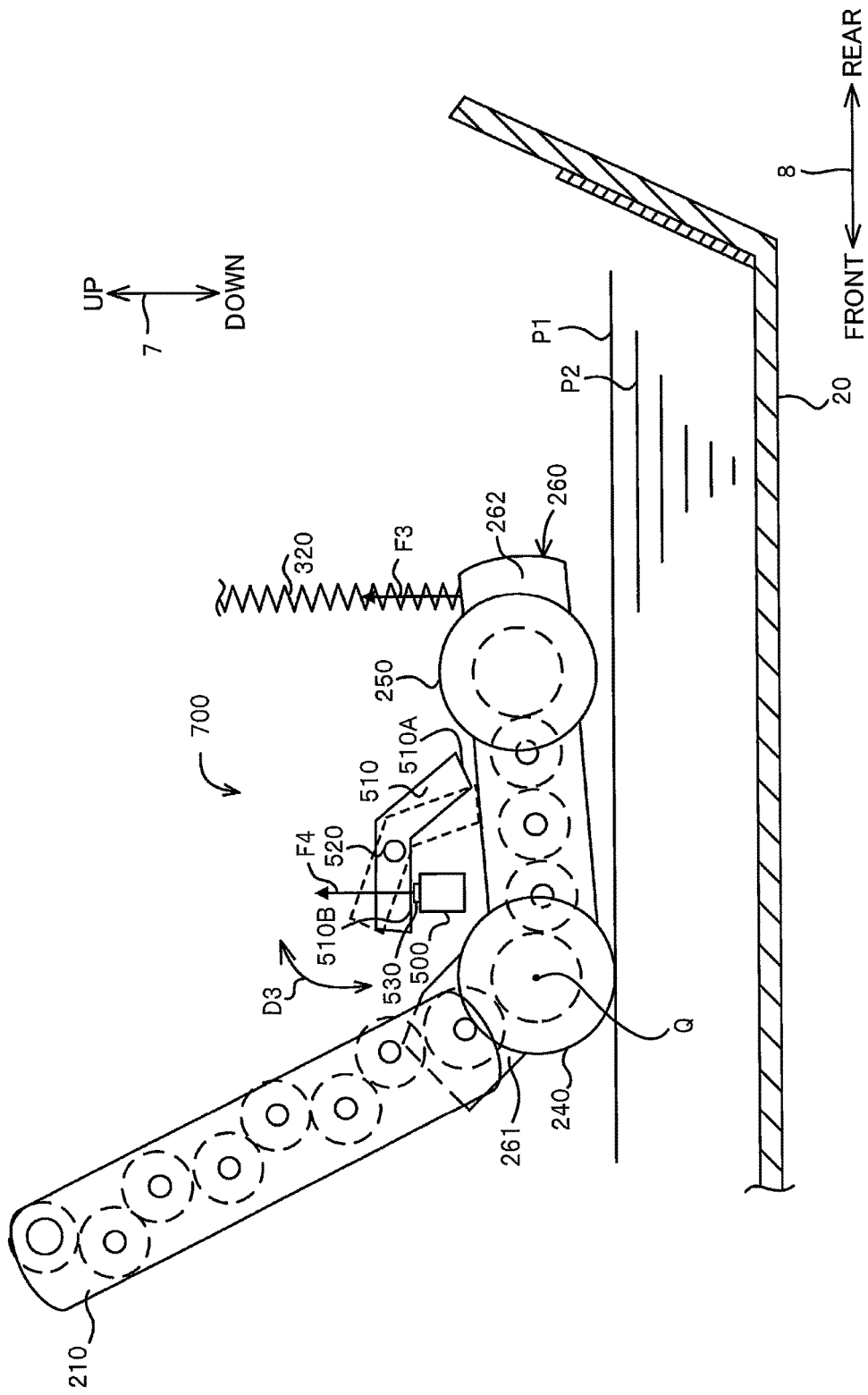
FIG. 10 is a schematic view illustrating a structure of a sheet-feeding portion according to a first modification.
Figure 11:
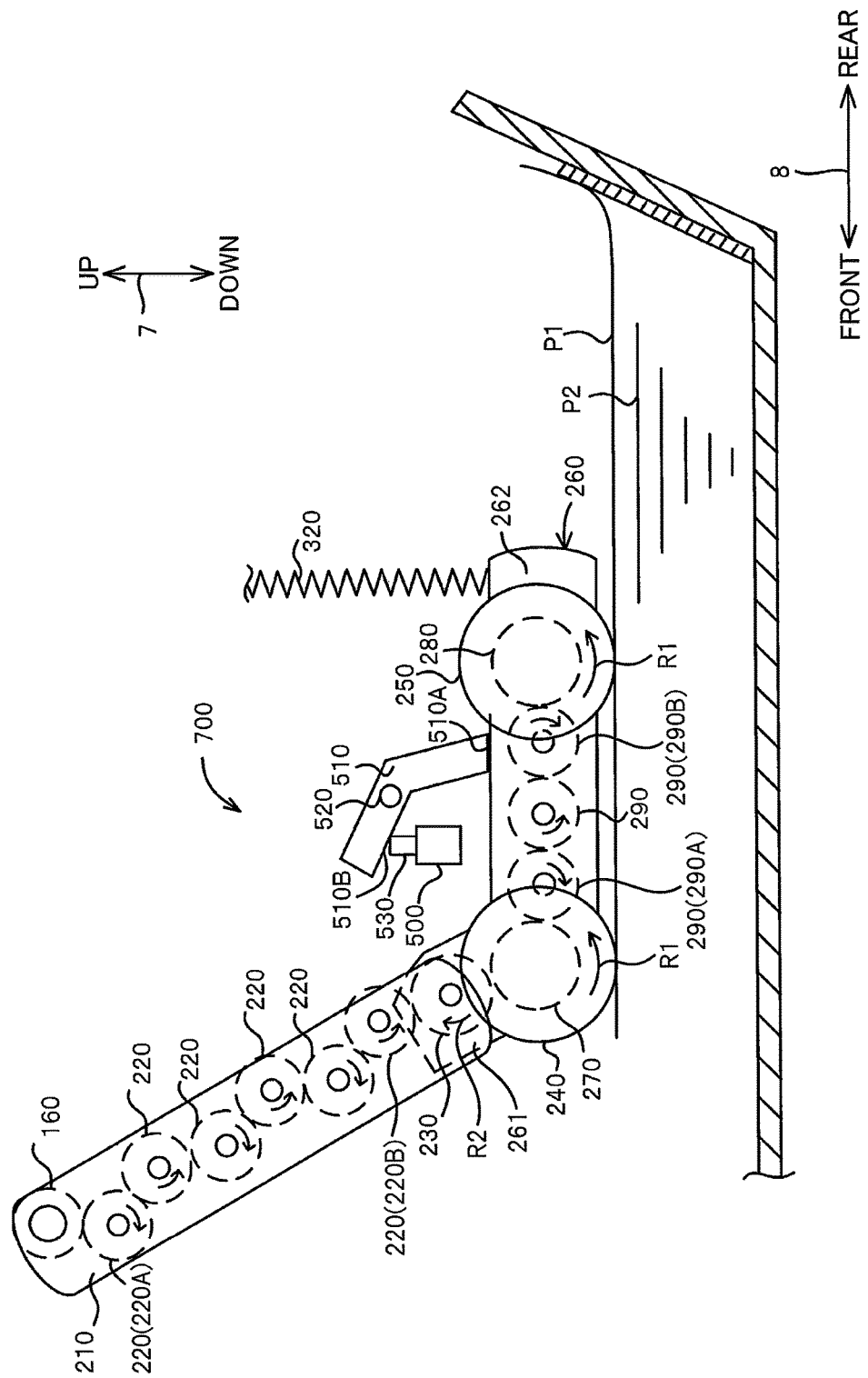
FIG. 11 is a schematic view of the sheet-feeding portion according to the first modification in a state where the second feeding roller is at the feeding position.

As illustrated in FIG. 10, a sheet-feeding portion 700 according to the first modification includes a pressing lever 510 and a solenoid 500, in addition to the components of the sheet-feeding portion 200 according to the embodiment. The pressing lever 510 is configured press the roller holder 260. The solenoid 500 is configured to cause the pressing lever 510 to pivot about a pivot shaft 520.

<Pressing Lever 510>

As illustrated in FIG. 10, the pressing lever 510 is provided above the roller holder 260. The pressing lever 510 is pivotable about the pivot shaft 520 in directions indicated by an arrow D3 (i.e., in the counterclockwise direction R1 and clockwise direction R2). The pivot shaft 520 is supported by the frame (not illustrated) of the apparatus main body. The pivot shaft 520 penetrates the pressing lever 510 in the left-right direction 9. The pressing lever 510 is thus pivotably supported by the pivot shaft 520. The pressing lever 510 includes a pressing portion 510A and a non-pressing portion 510B.

The pressing portion 510A is adapted to press the roller holder 260. The non-pressing portion 510B is adapted to receive a pressing force F4 from the solenoid 500. Normally, the pressing lever 510 is urged to a non-pressing position indicated by a solid line in FIG. 10 by a torsion coil spring (not illustrated). The pressing lever 510 is thus normally spaced apart from the roller holder 260 at the first position. As will be described later, in the feeding-position moving process of the first modification, the pressing lever 510 is caused to pivot about the pivot shaft 520 upon application of the pressing force F4 from the solenoid 500 on the non-pressing portion 510B, moving to a pressing position indicated by a broken line in FIG. 10. The pressing portion 510A is thus brought into abutment with the roller holder 260 at the first position, pressing the roller holder 260 downward to move the roller holder 260 from the first position to the second position.

<Solenoid 500>

Figure 12:
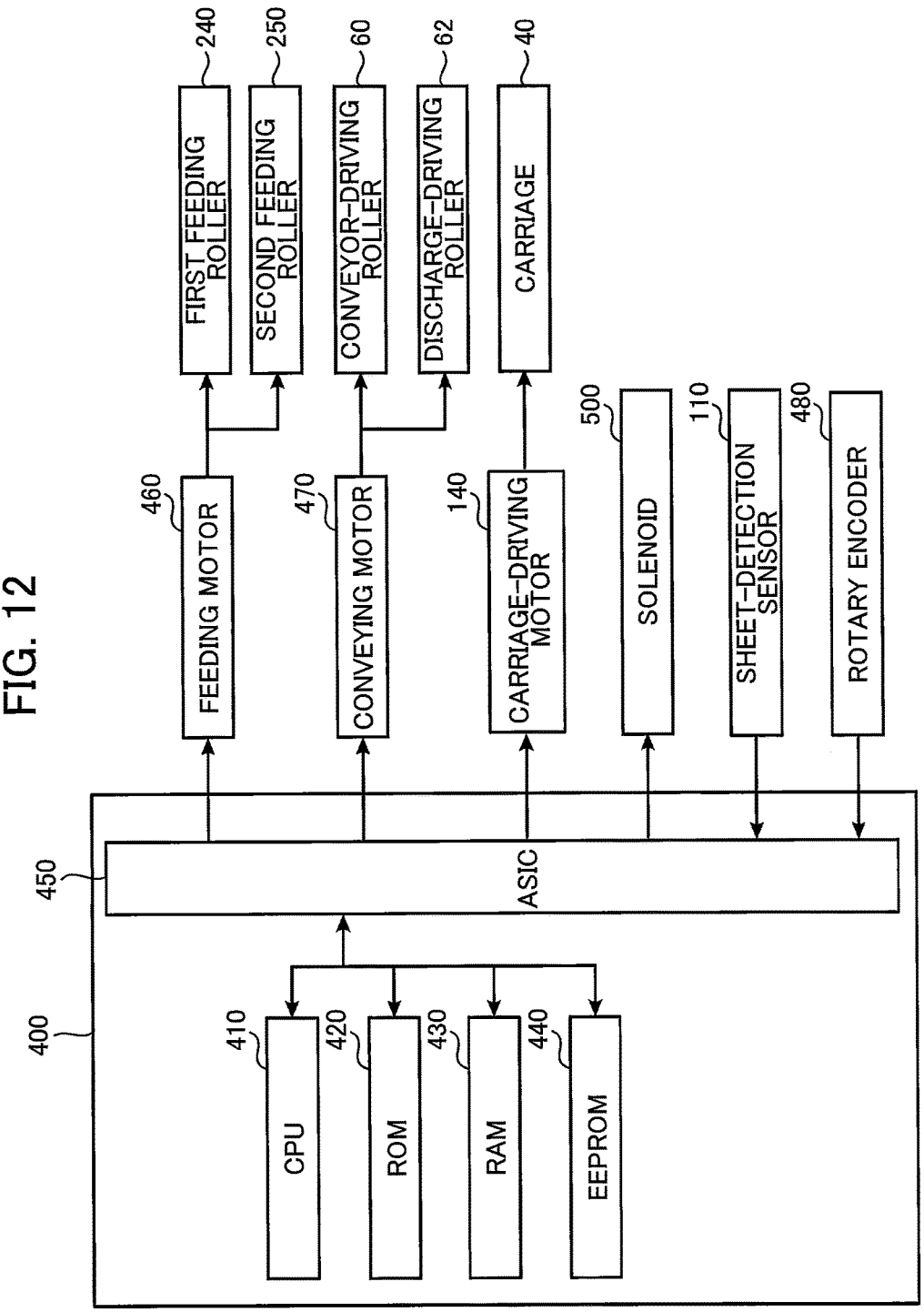
FIG. 12 is a diagram illustrating the internal structure of the controller and connections thereof in the multi-function device according to the first modification.

The solenoid 500 is a well-known solenoid. The solenoid 500 configured to linearly move a movable body 530 (see FIG. 10) in the up-down direction 7 by magnetic force generated at an electromagnetic coil when a current flows therethrough. As illustrated in FIG. 12, the solenoid 500 is connected to the ASIC 450. In response to input of a driving signal for driving the solenoid 500 from the CPU 410 to a drive circuit corresponding to the solenoid 500, a driving current corresponding to the driving signal is configured to be outputted to the solenoid 500 from the drive circuit. Thus, magnetic force is generated in the solenoid 500. The movable body 530 is caused to move up and down in the up-down direction 7 by the generated magnet force. In other words, the controller 400 is configured to control driving of the solenoid 500. The solenoid 500 is disposed at the frame (not illustrated) of the apparatus main body that supports the pivot shaft 520 of the pressing lever 510. The solenoid 500 is configured to be driven by the controller 400 to move the movable body 530 upward, thereby pressing the non-pressing portion 510B of the pressing lever 510 upward with the pressing force F4. The pressing lever 510 is thus moved from the non-pressing position to the pressing position.

Now, the sheet-feeding process according to the first modification executed by the controller 400 and operations of the sheet-feeding portion 700 during the sheet-feeding process will be described. In the following description, like parts, components, and processing will be designated with the same reference numerals as those of the embodiment to avoid duplicating description. Only features different from those of the embodiment will be described.

Figure 13:
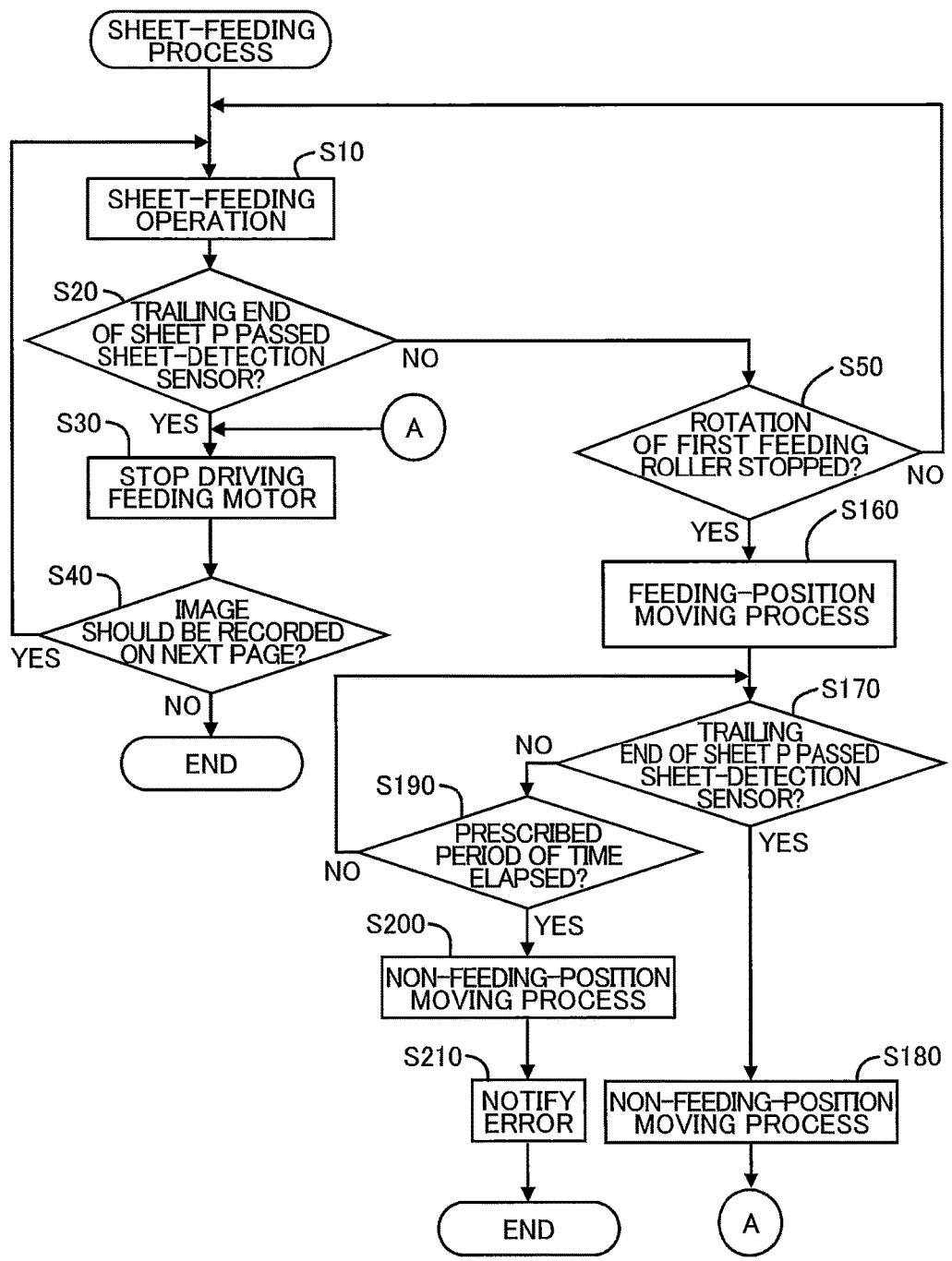
FIG. 13 is a flowchart illustrating steps of a sheet-feeding process executed by the controller according to the first modification.

The controller 400 is configured to execute the sheet-feeding process illustrated in a flowchart of FIG. 13 upon acquisition of an image-recording instruction to perform image-recording on a recording sheet P.

If the controller 400 determines in S50 that the first feeding roller 240 stops rotating during the sheet-feeding process and sheet-feeding has failed (S150: YES), the controller 400 executes the feeding-position moving process in S160 according to the first modification.

Specifically, in S160, the controller 400 drives the solenoid 500 to move the movable body 530 upward. The movable body 530 is thus brought into contact with the non-pressing portion 510B of the pressing lever 510 at the non-pressing position, pushing the pressing lever 510 upward with the pressing force F4. As a result of being pushed up by the movable body 530, the pressing lever 510 pivots in the clockwise direction R2 about the pivot shaft 520 to push the roller holder 260 at the first position downward. The roller holder 260 is thus caused to pivot in the clockwise direction R2 about the rotation center Q of the first feeding roller 240 against the urging force F3 of the coil springs 320, moving from the first position (se FIG. 10) to the second position (see FIG. 11). The movable body 530 on the solenoid 500 stops moving upward when the roller holder 260 has moved to the second position from the first position.

The controller 400 determines that the movable body 530 on the solenoid 500 has stopped moving based on the value of the driving current for driving the solenoid 500. The controller 400 thus determines that the roller holder 260 has moved to the second position. In accordance with movement of the roller holder 260 from the first position to the second position, the second feeding roller 250 moves from the non-feeding position to the feeding position. Thus, the recording sheet P can be fed with a greater contact area with the first feeding roller 240 and second feeding roller 250, as compared to the case where the recording sheet P is fed only by the first feeding roller 240. In this way, non-feeding of the recording sheet P can be resolved, and the recording sheet P can be fed rearward.

After executing the feeding-position moving process in S160, the controller 400 determines in S170 whether or not the trailing end of the recording sheet has passed through the sheet-detection sensor 110, as in S70 of the sheet-feeding process of the embodiment. That is, in S170, the controller 400 determines whether the trailing end of the recording sheet P has passed through the sheet-detection sensor 110 based on the signal outputted from the sheet-detection sensor 110. In case that the controller 400 determines in S170 that the trailing end of the recording sheet has passed through the sheet-detection sensor 110 (S170: YES), the controller 400 then executes a non-feeding-position moving process in S180.

As a result of the YES determination in S170, the controller 400 determines that the sheet-feeding failure has been resolved and the recording sheet P is successfully fed. Thus, in the non-feeding-position moving process of S180, the controller 400 drives the solenoid 500 to move the movable body 530 on the solenoid 500 back to the position (initial position) illustrated in FIG. 10 from the position (upward position) illustrated in FIG. 11. The pressing lever 510 therefore pivots upward about the pivot shaft 520 due to the biasing force of the torsion coil spring (not illustrated), moving from the pressing position to the non-pressing position. As the pressing lever 510 returns from the pressing position to the non-pressing position, the roller holder 260 pivots from the second position to the first position about the rotation center Q of the first feeding roller 240 due to the biasing force of the coil springs 320. The second feeding roller 250 therefore moves from the feeding position to the non-feeding position in accordance with the movement of the roller holder 260 from the second position to the first position.

On the other hand, in a case where the trailing end of the recording sheet P is determined not to have passed through the sheet-detection sensor 110 in S170 (S170: NO), the controller 400 stands by until the predetermined period of time has elapsed in S190. That is, the controller 400 repeats the routine of S170: NO and S190: NO until the predetermined period of time is determined to have elapsed in S190 (S190: YES). If the controller 400 determines in S190 that the predetermined period of time has elapsed before the trailing end of the recording sheet P passes through the sheet-detection sensor 110 (S190: YES), the controller 400 executes the non-feeding-position moving process in S200 to move the second feeding roller 250 back to the non-feeding position from the feeding position. The non-feeding-position moving process executed in S200 is identical to the non-feeding-position moving process executed in S180.

Here, "the predetermined period of time has elapsed before the trailing end of the recording sheet P passes through the sheet-detection sensor 110" denotes a state where the recording sheet P cannot be fed yet even though the second feeding roller 250 was moved to the feeding position as a result of the feeding-position moving process executed in S160. The controller 400 thus notifies the user in S210 that a sheet-feeding error has occurred through the operation interface 17 or a speaker (not illustrated), as in the depicted embodiment (see S100 of the sheet-feeding process in FIG. 6). The controller 400 subsequently ends the sheet-feeding process.

As described above, in the first modification, the controller 400 executes the feeding-position moving process for moving the second feeding roller 250 from the non-feeding position to the feeding position by means of the solenoid 500 and the pressing lever 510. Due to the provision of the solenoid 500 and the pressing lever 510 dedicated for moving the second feeding roller 250 from the non-feeding position to the feeding position, the second feeding roller 250 can be moved from the non-feeding position to the feeding position reliably at a desired timing, thereby reliably resolving non-feeding of the sheets P.

2. Second Modification

In the embodiment, the second feeding roller 250 is arranged rearward of the first feeding roller 240. Alternatively, the second feeding roller 250 may be disposed frontward of the first feeding roller 240, as illustrated in FIG. 14.

Figure 14:
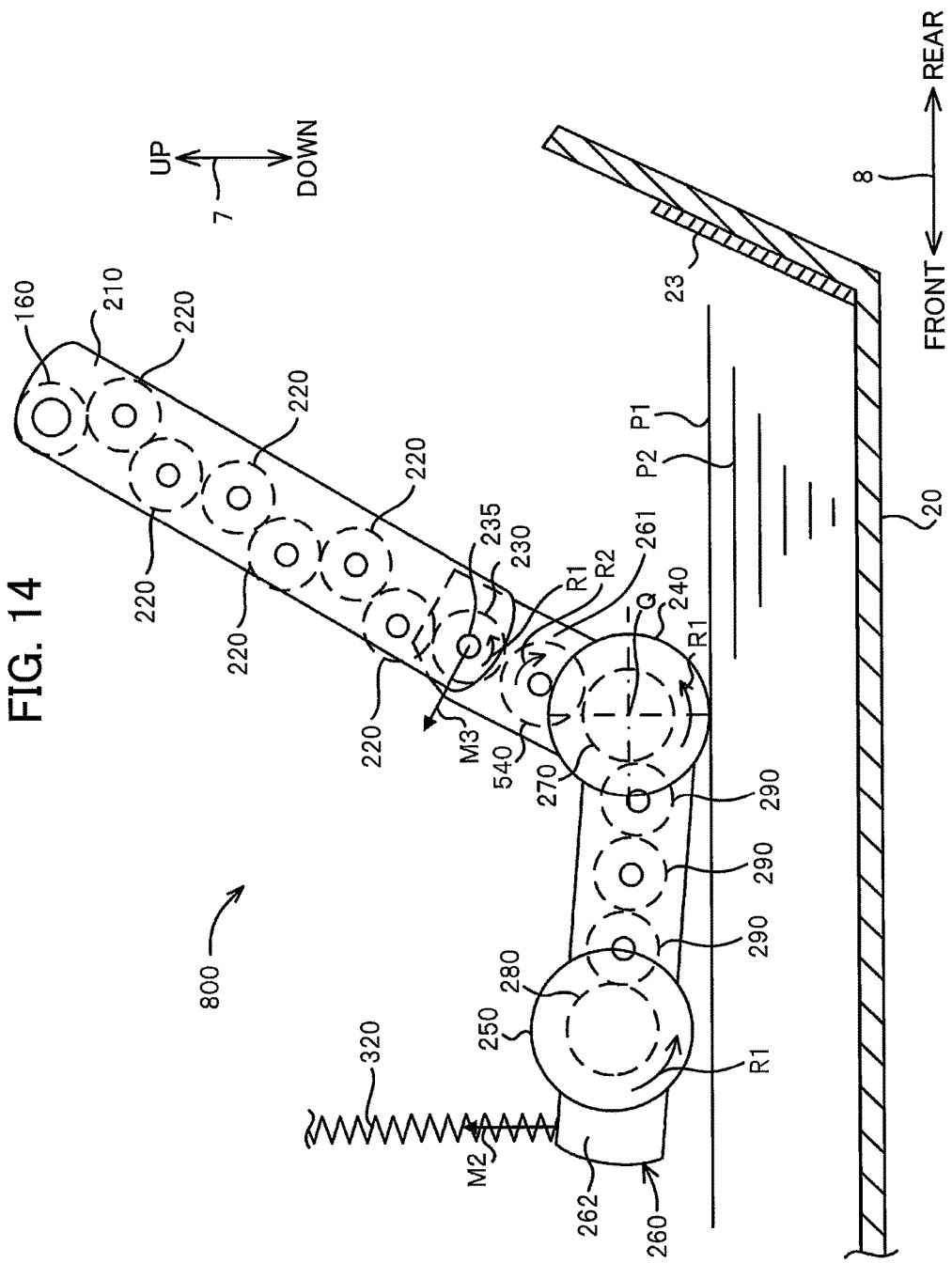
FIG. 14 is a schematic view of a sheet-feeding portion according to a second modification.

Specifically, referring to FIG. 14, a sheet-feeding portion 800 according to a second modification includes a gear 540, in addition to the components of the sheet-feeding portion 200 according to the embodiment. The gear 540 is rotatably supported by the roller holder 260 at a positon between the first feeding gear 270 and the transmission gear 230. The gear 540 meshes with the first feeding gear 270 and the transmission gear 230. In order to rotate the first feeding roller 240 in the counterclockwise direction R1, as illustrated in FIG. 14, the transmission gear 230 is configured to rotate in the counterclockwise direction R1 due to the interposition of the gear 540. That is, in the second modification, the transmission gear 230 is configured to rotate in a direction opposite to the direction in which the transmission gear 230 is configured to rotate in the embodiment (note that the transmission gear 230 is configured to rotate in the clockwise direction R2 in the embodiment, as shown in FIG. 7).

The transmission gear 230 is configured to move in a direction opposite to the direction of the arrow X (see FIG. 7) as the torque acting on the transmission gear 230 is raised. As a result, a third rotational moment M3 acts on the portion of the roller holder 260 that supports the shaft 235 in the counterclockwise direction R1 about the rotation center Q of the first feeding roller 240. As described in the embodiment, the controller 400 may control the value of the driving current of the feeding motor 460 such that the third rotational moment M3 becomes greater than the second rotational moment M2 applied on the roller holder 260 by the coil springs 320. As a result, the roller holder 260 is caused to pivot in the counterclockwise direction R1, enabling the second feeding roller 250 to move from the non-feeding position to the feeding position.

Since the second feeding roller 250 is arranged frontward of the first feeding roller 240, the first feeding roller 240 can be positioned closer to the separation plate 23 of the sheet tray 20 than if the second feeding roller 250 is provided rearward of the first feeding roller 240. This arrangement of the second modification is advantageous in preventing deformation of the recording sheet P that may abut on the separation plate 23 after being fed from the sheet tray 20.

To be more specific, when the recording sheet P fed by the first feeding roller 240 abuts the inclined separation plate 23 of the sheet tray 20, a leading end portion of the recording sheet P may deform due to the abutment against the separation plate 23. If a distance between the first feeding roller 240 and the inclined separation plate 23 is longer, the leading end portion of the recording sheet P is more likely to deform and may deflect to a greater extent upon abutting against the separation plate 23, which may cause the recording sheet P to get folded or may result in a paper jam. In the second modification, on the other hand, the second feeding roller 250 is disposed frontward of the first feeding roller 240, i.e., upstream relative to the first feeding roller 240 in the sheet-feeding direction 15, meaning that the distance between the first feeding roller 240 and the separation plate 23 can be shortened than otherwise. The structure of the second modification can therefore reduce the amount of deformation of the recording sheet P that may be caused by abutment against the separation plate 23. Since the recording sheet P is less likely to deform, the separation plate 23 can reliably separate the recording sheet P (uppermost sheet P1) from the recording sheet P located immediately below the uppermost sheet P1 (second uppermost sheet P2).

3. Third Modification

In the depicted embodiment, the recording sheets P are configured to be fed by the first feeding roller 240 and the second feeding roller 250. Alternatively, the recording sheets P may be fed by belts mounted over the first feeding roller 240 and the second feeding roller 250, in order to ensure an increased contact area with the recording sheet P.

Figure 15:
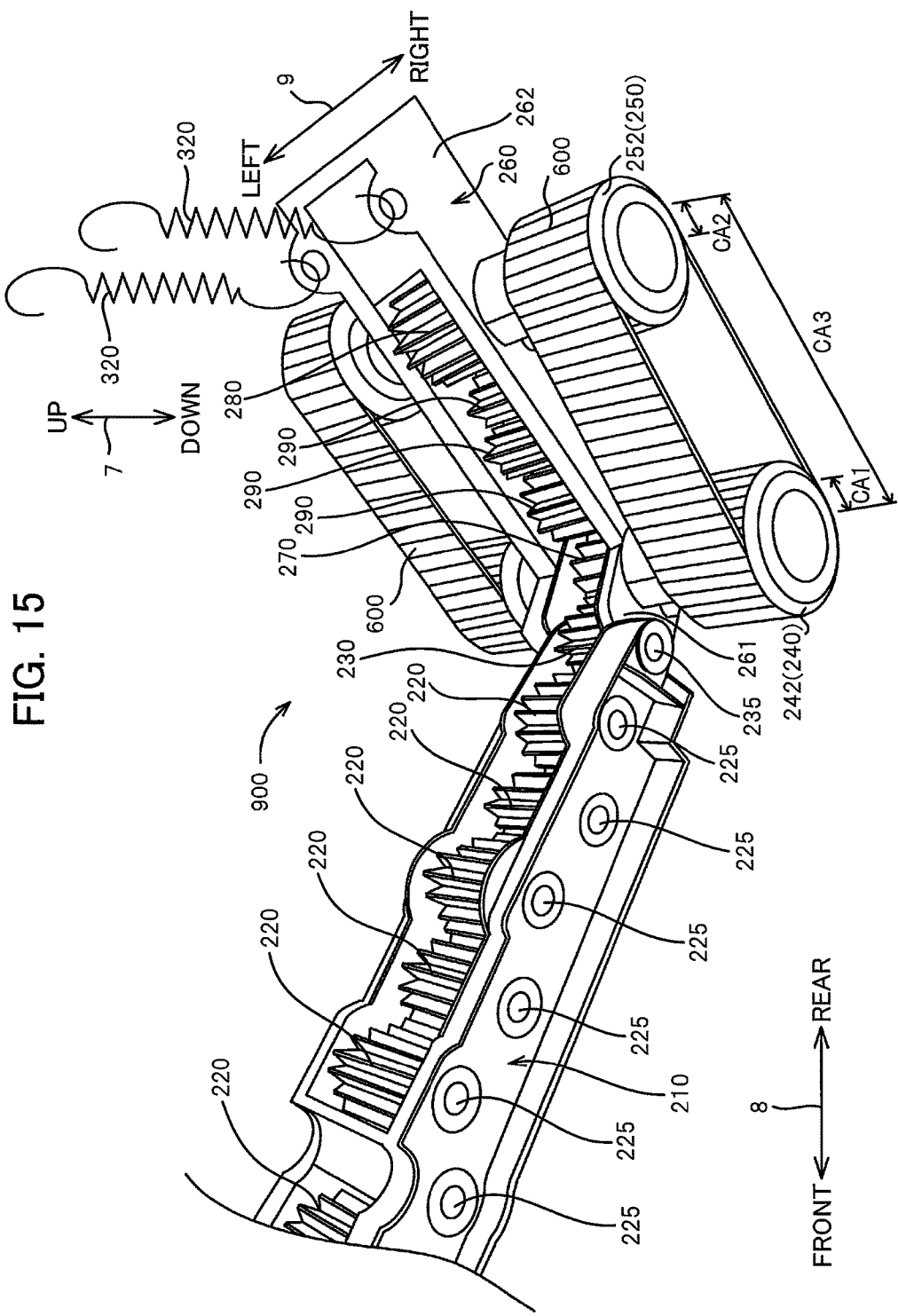
FIG. 15 is a perspective view of a sheet-feeding portion according to a third modification.

More specifically, as illustrated in FIG. 15, a sheet-feeding portion 900 according to a third modification to the embodiment includes a pair of sheet-feeding belts 600, in addition to the components of the sheet-feeding portion 200 according to the embodiment. Each sheet-feeding belt 600 is mounted over each roller portion 242 of the first feeding roller 240 and its corresponding roller portion 252 of the second feeding roller 250. The sheet-feeding belts 600 can thus provide a larger contacting area with the recording sheet P than a combination of the first feeding roller 240 and the second feeding roller 250 provide with the recording sheet P for feeding the sheets P, when the roller holder 260 has moved from the first position to the second position. That is, referring to FIG. 15, the sheet-feeding belts 600 contact the recording sheet P with a region CA3 that is larger than a sum of a region CA1 with which the first feeding roller 240 contacts the uppermost sheet P1 and a region CA2 with which the second feeding roller 250 contacts the recording sheet P. Put different way, the sheet-feeding belt 600 can make contact with the recording sheet P with the larger region CA3 when the second feeding roller 250 is at the feeding position than with the region CA1 when the second feeding roller 250 is at the non-feeding position. Thus, a larger frictional force can be generated between the recording sheet P and the sheet-feeding belt 600 at the region CA3, thereby more reliably feeding the recording sheet P to resolve a sheet-feeding failure.

Incidentally, in order to drive and circularly move the sheet-feeding belts 600, only one of the first feeding roller 240 and the second feeding roller 250 may be rotated. That is, the driving force of the feeding motor 460 need not be transmitted to both of the first feeding roller 240 and the second feeding roller 250. The driving force of the feeding motor 460 may be transmitted to only one of the first feeding roller 240 and the second feeding roller 250.

Note that, in the structure of the third modification, the controller 400 may perform the sheet-feeding process according to the embodiment (illustrated in FIG. 6), or the sheet-feeding process according to the first modification (illustrated in FIG. 13).

4. Fourth Modification

The roller portions 252 of the second feeding roller 250 may be formed of a material having smaller hardness (stiffness) than the material for the roller portions 242 of the first feeding roller 240. With this structure, the roller portions 252 of the second feeding roller 250 tend to elastically deform more easily than the roller portions 242 of the first feeding roller 240 does. Therefore, when the second feeding roller 250 has moved from the non-feeding position to the feeding position, the roller portions 252 of the second feeding roller 250 can abut on the recording sheet P with a larger contact area than the roller portions 242 of the first feeding roller 240 do, thereby providing a greater frictional force for feeding the recording sheets P.

5. Fifth Modification

Figure 16:
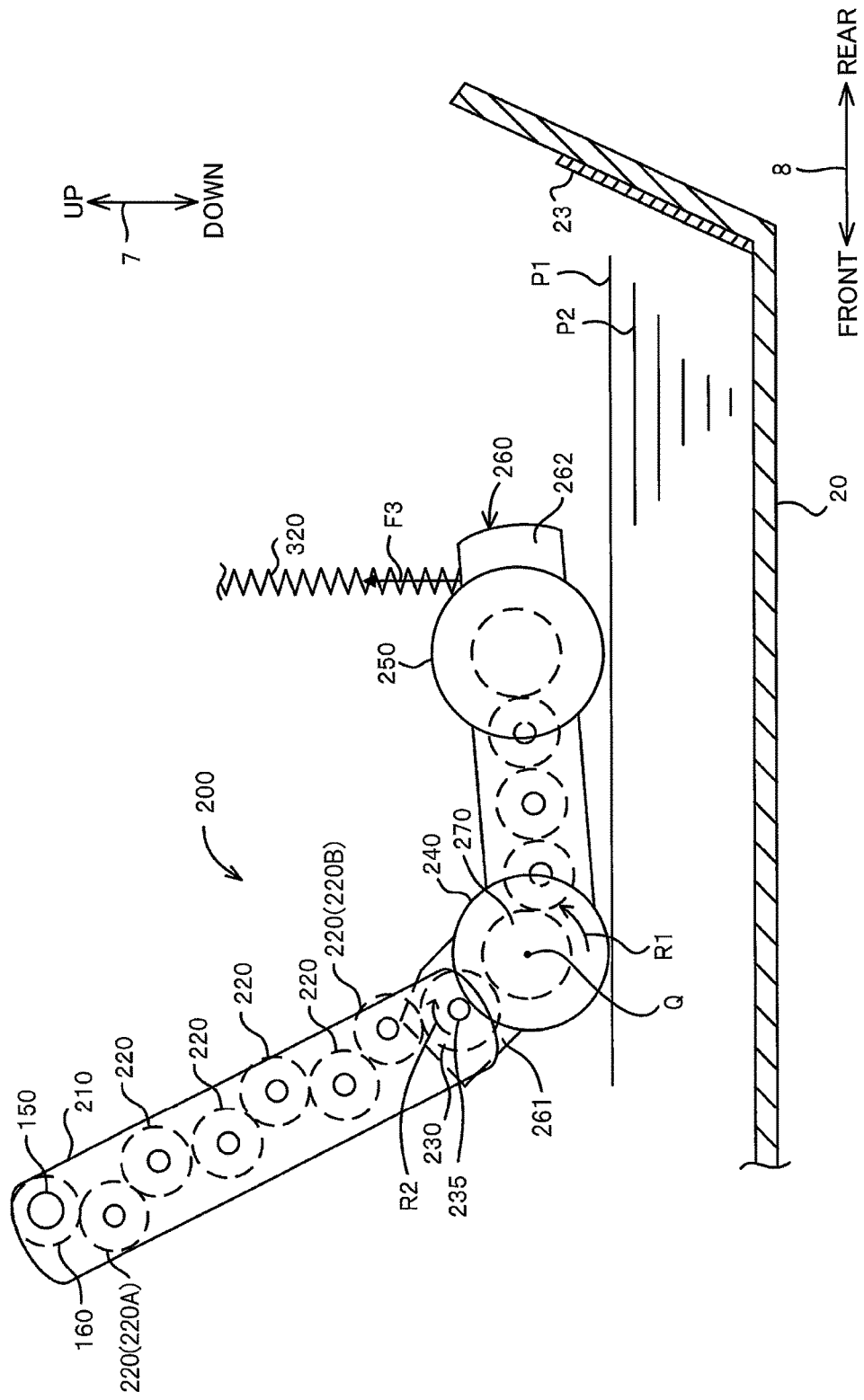
FIG. 16 is a schematic view of a sheet-feeding portion according to a fifth modification in a state where the second feeding roller is at the non-feeding position.

The second feeding roller 250 may have a diameter (roller diameter) larger than a diameter (roller diameter) of the first feeding roller 240, as illustrated in FIG. 16. With this structure, the second feeding roller 250 can provide a larger contact area with the recording sheet P than the first feeding roller 240 does with the recording sheet P, resulting in a greater frictional force for feeding the recording sheet P.

6. Sixth Modification

Roller surfaces of the roller portions 252 of the second feeding roller 250 may be formed of a material having a friction coefficient greater than that of roller surfaces of the roller portions 242 of the first feeding roller 240. With this structure as well, the recording sheet P can be fed with a larger frictional force when the second feeding roller 250 is put in the feeding position. Non-feeding of the recording sheet P can be resolved reliably, accordingly.

7. Seventh Modification

In the depicted embodiment, the plurality of gears 290 is employed to transmit the rotational driving force from the first feeding gear 270 to the second feeding gear 280, as illustrated in FIG. 4. Alternatively, the rotational driving force may be transmitted by a belt, instead of the gears 290.

In this case, a pulley well-known in the art may be provided on each of the shaft portion 241 and the shaft portion 251, and an endless belt may be wound over these pulleys. With this structure, since the shaft portion 241 supports the first feeding gear 270 and the shaft portion 251 supports the second feeding gear 280, the belt serves to transmit the rotational driving force of the first feeding gear 270 to the second feeding gear 280. This structure of the seventh modification allows the driving force of the feeding motor 460 to be transmitted to the second feeding roller 250.

8. Eighth Modification

Instead of transmitting the driving force of the feeding motor 460 to the second feeding roller 250, a driving motor for rotating the second feeding roller 250 may be provided separately from the feeding motor 460.

Figure 17:
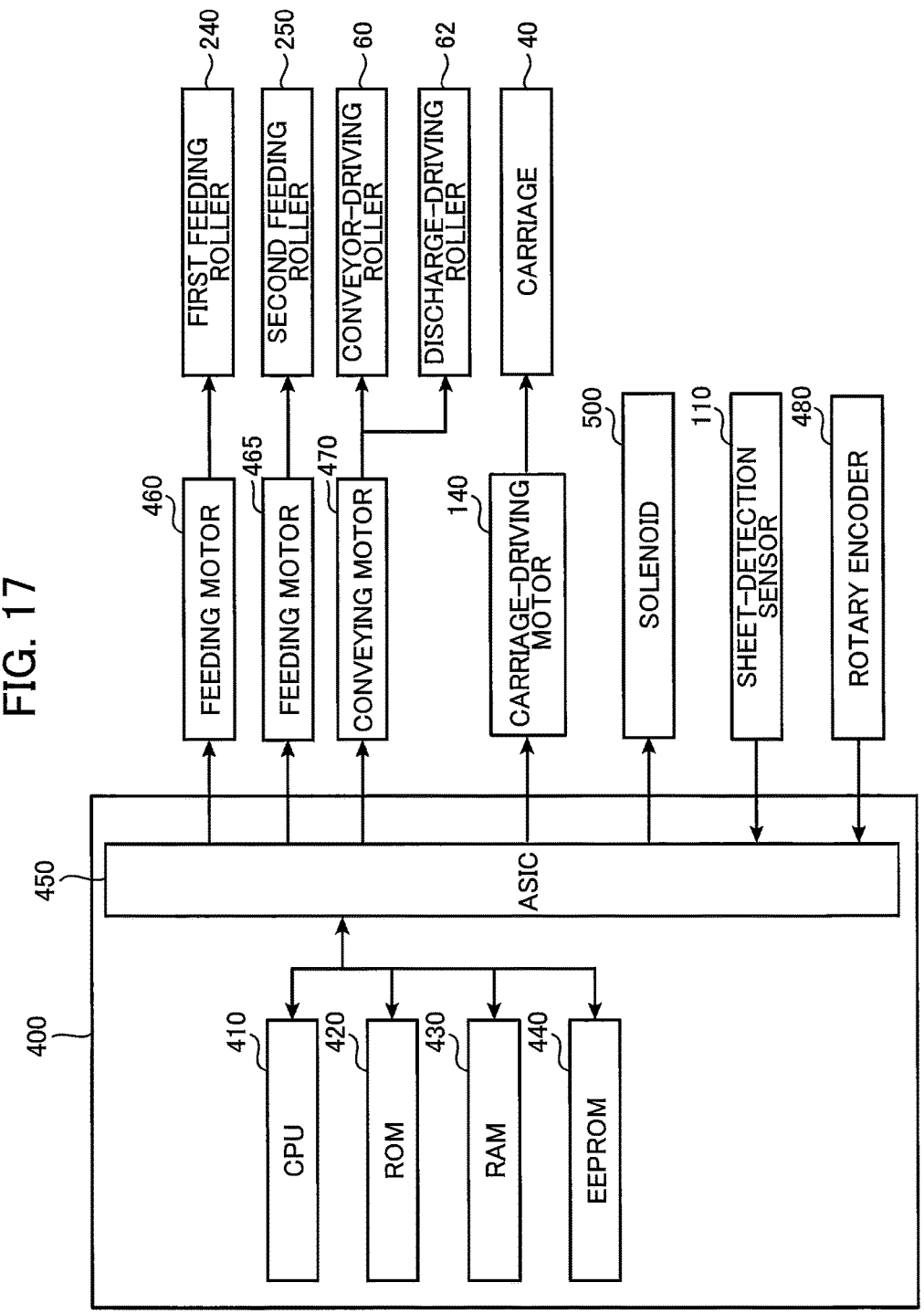
FIG. 17 is a diagram illustrating the internal structure of the controller and connections thereof in the multi-function device according to an eighth modification.

Specifically, in an eighth modification to the embodiment, as illustrated in FIG. 17, another feeding motor 465 is provided to be connected to the ASIC 450 to control rotation of the second feeding roller 250. That is, the second feeding roller 250 is configured to rotate by a rotational driving force of the feeding motor 465.

Figure 18:
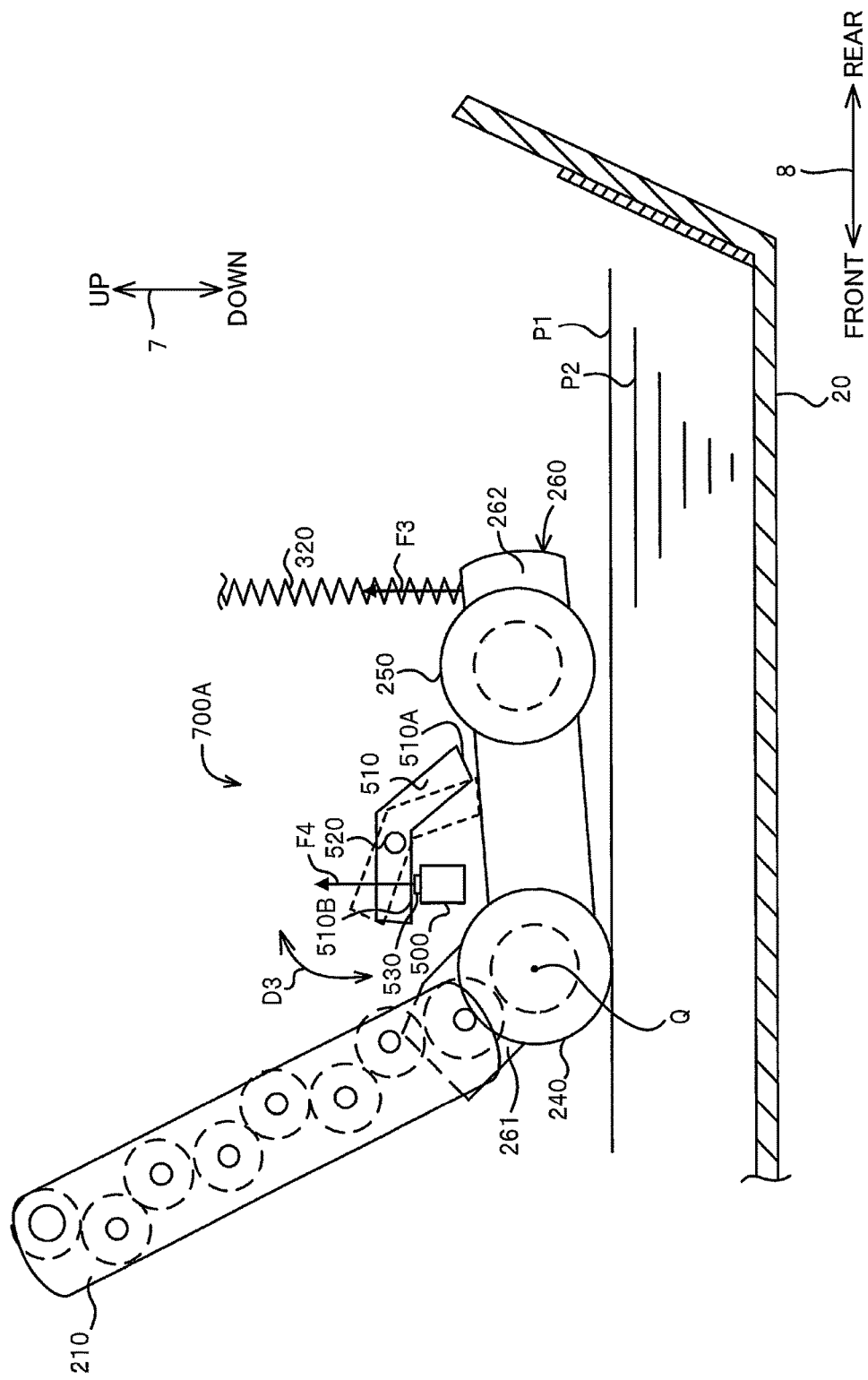
FIG. 18 is a schematic view illustrating a structure of a sheet-feeding portion according to the eighth modification in a state where the second feeding roller is at the non-feeding position.

As illustrated in FIGS. 18 and 19, a sheet-feeding portion 700A of the eighth modification does not include the plurality of gears 290, since the driving force of the feeding motor 460 is not necessary to be transmitted to the second feeding roller 250. Hence, the roller holder 260 is movable between the first position and the second position to move the second feeding roller 250 between the non-feeding position and feeding position by the structure using the solenoid 500 and the pressing lever 510 according to the first modification. That is, the eighth modification can be combined with the first modification.

The controller 400 is thus configured to feed the recording sheets P according to the sheet-feeding process of FIG. 13. In the eighth modification, the controller 400 may determine that the second feeding roller 250 is at the feeding position after execution of the processing of S160, whereas the controller 400 may determine that the second feeding roller 250 is at the non-feeding position after execution of the processing of S180 and S200.

With this configuration, the second feeding roller 250 can be rotated by the feeding motor 465 independently of the rotation of the first feeding roller 240. That is, in the eighth modification, the second feeding roller 250 can be controlled so as not to rotate when the second feeding roller 250 need not feed the recording sheet P (when the second feeding roller 250 is at the non-feeding position), while the second feeding roller 250 can be controlled to rotate to feed the recording sheet P at such a timing that the second feeding roller 250 is determined to have moved to the feeding position.

In a case where the second feeding roller 250 is configured to freewheel at the non-feeding position, noise may result. However, according to the structure of the eighth modification, the second feeding roller 250 is prevented from rotating as long as the second feeding roller 250 is at the non-feeding position. Thus, occurrence of noise can be suppressed.

9. Ninth Modification

The roller holder 260 is urged to the first position by the coil springs 320 in the embodiment. Alternatively, the roller holder 260 may be urged by elastic rubber or a leaf spring, instead of the coil springs 320.

10. Tenth Modification

In the embodiment, the gear holder 210 and the roller holder 260 are coupled to each other by the shaft 235 that serves as the rotation shaft of the transmission gear 230. Alternatively, the gear holder 210 and the roller holder 260 may be coupled to each other by a member different from the shaft 235. For example, the gear holder 210 and the roller holder 260 may be coupled to each other by a pin or a screw; and the transmission gear 230 may be rotatably supported only by the gear holder 210. In the case, the first rotational moment M1 that acts on the roller holder 260 may act on a portion of the roller holder 260 at which the roller holder 260 is coupled to the gear holder 210 by the pin or the screw.

11. Eleventh Modification

In the sheet-feeding process of the embodiment, the controller 400 determines in S70 that the trailing end of the recording sheet P has passed through the sheet-detection sensor 110 based on the signal outputted from the sheet-detection sensor 110, thereby determining that the sheet-feeding process has ended for a single recording sheet P. However, the controller 400 may determine that the sheet-feeding process has finished for a single recording sheet P through a different method.

For example, the controller 400 may determine that the sheet-feeding process has finished for a single recording sheet P based on the number of edges of the pulse signals outputted from the rotary encoder 480. More specifically, the controller 400 may determine the ending of the sheet-feeding process in a case where the counted number of the edges of the pulse signals reaches a number (target value) corresponding to the distance by which the leading end of the recording sheet P moves from the position when stacked in the sheet tray 20 to the position of the conveying-roller pair 58. In this configuration, the controller 400 may determines that the sheet-feeding process has finished for a single recording sheet P when the number of edges of the pulse signals outputted from the rotary encoder 480 reaches the target value within the predetermined period of time described for S80 of the embodiment. Likewise, the controller 400 may determine that a sheet-feeding failure has not been resolved in case that the number of edges of the pulse signals outputted from the rotary encoder 480 does not reach the target value even if the predetermined period of time has elapsed.

The depicted embodiment and various modifications thereof may be combined appropriately.

[Remarks]

The sheet tray 20 is an example of a sheet-accommodation portion. The separation plate 23 is an example of a separation member. The front-rear direction 8 and sheet-feeding direction 15 is an example of a sheet-feeding direction. The first feeding roller 240 is an example of a first feeding roller and an example of a first roller. The second feeding roller 250 is an example of a second feeding roller and an example of a second roller. The feeding motor 460 is an example of a driving source; an example of a first motor; and an example of a roller driving portion. The sheet-detection sensor 110 is an example of a first sensor. The rotary encoder 480 is an example of a second sensor. The gears 290 and second feeding gear 280 are an example of a transmission portion; and an example of second gears. The controller 400 is an example of a controller. The first feeding gear 270 is an example of a feeding gear. The transmission gear 230 is an example of a transmission gear. The gear 160 and gears 220 are an example of first gears. The roller holder 260 is an example of a roller holder. The shaft 150 is an example of a predetermined shaft. The gear holder 210 is an example of a gear holder. The shaft 235 is an example of a connecting portion. The pin and screw connecting the gear holder 210 and roller holder 260 according to the tenth modification are another example of a connecting portion. The coil springs 320 are an example of an urging member. The elastic rubber and the leaf spring of the ninth modification are another example of the urging member. The first arm portion 261 is an example of a first arm portion. The second arm portion 262 is an example of a second arm portion. The first rotational moment M1 is an example of a first rotational moment. The urging force F3 is an example of an urging force. The feeding motor 465 is an example of a second motor. The second rotational moment M2 is an example of a second rotational moment. The first driving current V1 is an example of a first driving current. The second driving current V2 is an example of a second driving current. The sheet-feeding processes illustrated in FIG. 6 and FIG. 13 are an example of a sheet-feeding operation. The non-feeding position is an example of a non-feeding position. The feeding position is an example of a feeding position. The sheet-feeding belt 600 is an example of a feeding belt. The first position is an example of a separated position. The second position is an example of a proximity position. The shaft 235, roller holder 260, pressing lever 510, pivot shaft 520, coil spring 320 are an example of a moving mechanism. The solenoid 500 and movable body 530 are an example of a moving-mechanism driving portion. The first feeding gear 270, gear 160, gears 220, transmission gear 230, shaft 150, gear holder 210, shaft 235, roller holder 260, coil springs 320, pressing lever 510, pivot shaft 520, solenoid 500, movable body 530 and controller 400 are an example of a roller actuating portion.

What is claimed is:

1. A sheet-feeding device comprising:
a sheet-accommodation portion configured to accommodate therein a sheet;
a first feeding roller configured to contact the sheet accommodated in the sheet-accommodation portion and to feed the sheet in a sheet-feeding direction;
a second feeding roller movable between a non-feeding position and a feeding position, the second feeding roller at the non-feeding position being spaced away from the sheet accommodated in the sheet-accommodation portion, the second feeding roller at the feeding position being in contact with the sheet and configured to feed the sheet in the sheet-feeding direction;
a driving source configured to generate a rotational driving force to rotate the first feeding roller;
a transmission portion configured to transmit the rotational driving force from the first feeding roller to the second feeding roller to rotate the second feeding roller;
a first sensor configured to detect whether or not a sheet-feeding operation is completed for the sheet; and
a second sensor configured to detect whether or not rotation of the first feeding roller is stopped during the sheet-feeding operation for feeding the sheet; and
a roller actuating portion configured to move the second feeding roller from the non-feeding position to the feeding position in a case where the second sensor detects that the rotation of the first feeding roller is stopped during the sheet-feeding operation, the roller actuating portion being also configured to move the second feeding roller from the feeding position to the non-feeding position in a case where the first sensor detects that the sheet-feeding operation is completed for the sheet.

2. The sheet-feeding device according to claim 1, wherein the roller actuating portion comprises:
a moving mechanism configured to movably support the second feeding roller between the non-feeding position and the feeding position;
a moving-mechanism driving portion configured to move the moving mechanism to allow the second feeding roller to move between the non-feeding position and the feeding position; and
a controller configured to drive the moving-mechanism driving portion to move the second feeding roller from the non-feeding position to the feeding position in the case where the second sensor detects that the rotation of the first feeding roller is stopped during the sheet-feeding operation for the sheet, the controller being also configured to drive the moving-mechanism driving portion to move the second feeding roller from the feeding position to the non-feeding position in the case where the first sensor detects that the sheet-feeding operation is completed.

3. The sheet-feeding device according to claim 1, wherein the roller actuating portion comprises:
a feeding gear rotatable integrally with the first feeding roller;
a gear train configured of a plurality of first gears and a transmission gear in mesh with the feeding gear, the gear train being configured to transmit the rotational driving force of the driving source to the first feeding roller;

a roller holder rotatably supporting the first feeding roller and the second feeding roller, the roller holder being pivotally movable about a rotation center of the first feeding roller between a first position at which the second feeding roller is at the non-feeding position and a second position at which the second feeding roller is at the feeding position;

a gear holder rotatably supporting the plurality of first gears and the transmission gear constituting the gear train, the gear holder being pivotally movable about a predetermined shaft by a moving force according to a magnitude of the rotational driving force of the driving source with which the transmission gear is moved along an outer peripheral portion of the feeding gear while transmitting the rotational driving force of the driving source to the feeding gear;

a connecting portion pivotally movably connecting the roller holder to the gear holder;

an urging member urging the roller holder from the second position toward the first position; and a controller, wherein the roller holder comprises a first arm portion and a second arm portion arranged opposite to each other in the sheet-feeding direction, the first arm portion being connected to the gear holder through the connecting portion, and the second arm portion being connected to the urging member;

wherein the roller holder is configured to pivotally move from the first position to the second position by a first rotational moment about the rotation center of the first feeding roller, the first rotational moment acting on the connecting portion by the moving force with which the transmission gear is moved along the outer peripheral portion of the feeding gear, and the roller holder being configured to pivotally move from the second position to the first position by a second rotational moment about the rotation center of the first feeding roller, the second rotational moment acting on the second arm portion by an urging force of the urging member;

wherein the controller is configured to:
  drive the driving source with a first driving current to perform the sheet-feeding operation;
  drive the driving source with a second driving current larger than the first driving current in a case where the second sensor detects that the rotation of the first feeding roller is stopped during the sheet-feeding operation; and
  stop driving the driving source in a case where the first sensor detects that the sheet-feeding operation is completed or the sheet; and wherein the first driving current applied to the driving source is such a level that the first rotational moment becomes smaller than the second rotational moment, and the second driving current applied to the driving source being such a level that the first rotational moment becomes greater than the second rotational moment.

4. The sheet-feeding device according to claim 3, wherein the transmission portion comprises a gear train configured of a plurality of second gears including a gear in mesh with the feeding gear, the plurality of second gears being configured to transmit the rotational driving force of the driving source to the second feeding roller.

5. The sheet-feeding device according to claim 1, further comprising a separation member disposed downstream of the first feeding roller and the second feeding roller in the sheet-feeding direction, the separation member being configured to contact the sheet fed by the first feeding roller and to separate the sheet from another sheet accommodated in the sheet-accommodation portion,
  wherein the second feeding roller is positioned upstream of the first feeding roller in the sheet-feeding direction.

6. The sheet-feeding device according to claim 1, wherein the second feeding roller has a roller diameter greater than a roller diameter of the first feeding roller.

7. The sheet-feeding device according to claim 1, wherein the second feeding roller has a roller surface whose frictional coefficient is higher than a frictional coefficient of a roller surface of the first feeding roller.

8. The sheet-feeding device according to claim 1, wherein the second feeding roller has a hardness lower than a hardness of the first feeding roller, and the second feeding roller provides a contacting area relative to the sheet greater than a contacting area of the first feeding roller relative to the sheet.

9. A sheet-feeding device comprising:
  a sheet-accommodation portion configured to accommodate therein a sheet;
  a first feeding roller configured to contact the sheet accommodated in the sheet-accommodation portion and to feed the sheet in a sheet-feeding direction;
  a second feeding roller movable between a non-feeding position and a feeding position, the second feeding roller at the non-feeding position being spaced away from the sheet accommodated in the sheet-accommodation portion, the second feeding roller at the feeding position being in contact with the sheet and configured to feed the sheet in the sheet-feeding direction;
  a first motor configured to generate a rotational driving force to rotate the first feeding roller;
  a second motor configured to generate a rotational driving force to rotate the second feeding roller;
  a first sensor configured to detect whether or not a sheet-feeding operation is completed for the sheet; and
  a second sensor configured to detect whether or not rotation of the first feeding roller is stopped during the sheet-feeding operation for feeding the sheet;
  a roller actuating portion configured to move the second feeding roller from the non-feeding position to the feeding position in a case where the second detector detects that the rotation of the first feeding roller is stopped during the sheet-feeding operation, the roller actuating portion being also configured to move the second feeding roller from the feeding position to the non-feeding position in a case where the first sensor detects that the sheet-feeding operation is completed for the sheet, the roller actuating portion comprising:
    a moving mechanism configured to movably support the second feeding roller between the non-feeding position and the feeding position;
    a moving-mechanism driving portion configured to move the moving mechanism to allow the second feeding roller to move between the non-feeding position and the feeding position; and
    a controller configured to:
      determine whether the second feeding roller is at the non-feeding position or at the feeding position;
      drive the moving-mechanism driving portion to move the second feeding roller from the non-feeding position to the feeding position in the case where the second sensor detects that the rotation of the first feeding roller is stopped during the sheet-feeding operation for the sheet;

drive the second motor to rotate the second feeding roller in a case where the second feeding roller is determined to be at the feeding position;

drive the moving-mechanism driving portion to move the second feeding roller from the feeding position to the non-feeding position in the case where the first sensor detects that the sheet-feeding operation is completed; and stop driving to the second motor to stop rotation of the second feeding roller in a case where the second feeding roller is determined to be at the non-feeding position.

10. A sheet-feeding device comprising:

a sheet-accommodation portion configured to accommodate therein a sheet;

a first roller;

a second roller movable between a separated position spaced away from the sheet accommodated in the sheet-accommodation portion and a proximity position closer to the sheet accommodated in the sheet-accommodation portion than the separated position is to the sheet;

a feeding belt mounted over the first roller and the second roller, the feeding belt being configured to contact the sheet accommodated in the sheet-accommodation portion;

a roller driving portion configured to generate a rotational driving force to rotate at least one of the first roller and the second roller, the feeding belt being configured to move upon receipt of the rotational driving force to feed the sheet in a sheet-feeding direction;

a first sensor configured to detect whether or not a sheet-feeding operation is completed for the sheet;

a second sensor configured to detect whether or not movement of the feeding belt is stopped during the sheet-feeding operation; and a roller actuating portion configured to move the second roller from the separated position to the proximity position in a case where the second sensor detects that the movement of the feeding belt is stopped during the sheet-feeding operation for the sheet, the roller actuating portion being also configured to move the second roller from the proximity position to the separated position in a case where the first sensor detects that the sheet-feeding operation is completed for the sheet, wherein the feeding belt has a first region in contact with the sheet accommodated in the sheet-accommodation portion in a case where the second roller is at the separated position, and the feeding belt has a second region in contact with the sheet accommodated in the sheet-accommodation portion in a case where the second roller is at the proximity position, the second region being larger than the first region.

11. The sheet-feeding device according to claim 10, wherein the roller actuating portion comprises:

a moving mechanism configured to movably support the second roller between the separated position and the proximity position;

a moving-mechanism driving portion configured to move the moving mechanism to allow the second roller to move between the separated position and the proximity position; and a controller configured to drive the moving-mechanism driving portion to move the second roller from the separated position to the proximity position in the case where the second sensor detects that the movement of the feeding belt is stopped during the sheet-feeding operation, the controller being also configured to drive the moving-mechanism driving portion to move the second roller from the proximity position to the separated position in the case where the first sensor detects that the sheet-feeding operation is completed for the sheet.

12. The sheet-feeding device according to claim 10, wherein the roller actuating portion comprises:

a feeding gear rotatable integrally with the first roller;

a gear train configured of a plurality of gears and a transmission gear in meshing engagement with the feeding gear, the gear train being configured to transmit the rotational driving force of the roller driving portion to the first roller;

a roller holder rotatably supporting the first roller and the second roller, the roller holder being pivotally movable about a rotation center of the first roller between a first position at which the second roller is at the separated position and a second position at which the second roller is at the proximity position;

a gear holder rotatably supporting the plurality of gears and the transmission gear constituting the gear train, the gear holder being pivotally movable about a predetermined shaft by a moving force according to a magnitude of the rotational driving force of the roller driving portion with which the transmission gear is moved along an outer peripheral portion of the feeding gear while transmitting the rotational driving force of the roller driving portion to the feeding gear;

a connecting portion pivotally movably connecting the roller holder to the gear holder;

an urging member urging the roller holder from the second position toward the first position; and a controller, wherein the roller holder comprises a first arm portion and a second arm portion arranged opposite to each other in the sheet-feeding direction, the first arm portion being connected to the gear holder through the connecting portion, and the second arm portion being connected to the urging member;

wherein the roller holder is configured to pivotally move from the first position to the second position by a first rotational moment about the rotation center of the first roller, the first rotational moment acting on the connecting portion by the moving force with which the transmission gear is moved along the outer peripheral portion of the feeding gear, and the roller holder being configured to pivotally move from the second position to the first position by a second rotational moment about the rotation center of the first roller, the second rotational moment acting on the second arm portion by an urging force of the urging member;

wherein the controller is further configured to:

drive the roller driving portion with a first driving current to perform the sheet-feeding operation;

drive the roller driving portion with a second driving current larger than the first driving current in a case where the second sensor detects that the rotation of the first roller is stopped during the sheet-feeding operation; and stop driving the roller driving portion in a case where the first sensor detects that the sheet-feeding operation is completed; and wherein the first driving current applied to the roller driving portion is such a level that the first rotational moment becomes smaller than the second rotational moment, and the second driving current applied to the roller driving portion is such a level that the first rotational moment becomes greater than the second rotational moment.

* * * * *